(12) United States Patent
Thouin

(10) Patent No.: US 12,429,702 B2
(45) Date of Patent: Sep. 30, 2025

(54) IMAGING SYSTEMS AND METHODS FOR DUAL DEPTH AND POLARIZATION SENSING

(71) Applicant: AIRY3D INC., Montréal (CA)

(72) Inventor: Félix Thouin, Montréal (CA)

(73) Assignee: AIRY3D INC., Montreal (CA)

( * ) Notice: Subject to any disclaimer, the term of this patent is extended or adjusted under 35 U.S.C. 154(b) by 363 days.

(21) Appl. No.: 18/251,886

(22) PCT Filed: Nov. 4, 2021

(86) PCT No.: PCT/CA2021/051566
§ 371 (c)(1),
(2) Date: May 5, 2023

(87) PCT Pub. No.: WO2022/099408
PCT Pub. Date: May 19, 2022

(65) Prior Publication Data
US 2024/0012262 A1 Jan. 11, 2024

Related U.S. Application Data

(60) Provisional application No. 63/111,888, filed on Nov. 10, 2020.

(51) Int. Cl.
*G02B 27/42* (2006.01)
*G02B 27/09* (2006.01)
*G02B 27/28* (2006.01)

(52) U.S. Cl.
CPC ....... *G02B 27/0944* (2013.01); *G02B 27/283* (2013.01); *G02B 27/4205* (2013.01)

(58) Field of Classification Search
CPC .............. G02B 27/0944; G02B 27/283; G02B 27/1086; G02B 27/4272; G02B 27/4261
See application file for complete search history.

(56) References Cited

U.S. PATENT DOCUMENTS

| 2015/0125943 A1 | 5/2015 | Molnar et al. |
| 2018/0143485 A1 | 5/2018 | Oh |
| 2019/0257987 A1 | 8/2019 | Saari et al. |

FOREIGN PATENT DOCUMENTS

| WO | WO-2019109182 A1 * | 6/2019 | ........... H04N 13/271 |
| WO | 2020101891 A1 | 5/2020 | |

OTHER PUBLICATIONS

International Search report issued in International Application No. PCT/CA2021/051566 mailed Jan. 25, 2022, 4 pages.
(Continued)

*Primary Examiner* — Paisley L Wilson
(74) *Attorney, Agent, or Firm* — KDW FIRM PLLC

(57) ABSTRACT

An imaging system includes a transmissive diffraction mask (TDM), a pixel array, and a processor. The TDM includes a first and a second diffraction grating configured to diffract light received from a scene to generate first diffracted light encoding information about an angle of incidence (AOI) of the received light and second diffracted light encoding information about the AOI and a state of polarization (SOP) of the received light, respectively. The pixel array includes a first and a second set of pixels configured to detect the first and second diffracted light and generate therefrom a corresponding first and second set of pixel responses, respectively. The processor is configured to determine, from the first set of pixel responses, AOI data conveying the AOI of the received light, and determine, from the second set of pixel responses and the AOI data, polarization data conveying the SOP of the received light.

20 Claims, 15 Drawing Sheets

(56) References Cited

OTHER PUBLICATIONS

Jayasuriya et al. Dual light field and polarization imaging using CMOS diffractive image sensors, Optics Letters, vol. 40, No. 10, May 15, 2015, 5 pages.

Saito et al., Measurement of Surface Orientations of Transparent Objects Using Polarization in Highlight, 1999 IEEE Computer Society Conference on Computer Vision and Pattern Recognition, Print ISSN: 1063-6919, Jun. 23, 1999, 6 pages.

Varghese et al., Polarization-Based Angle Sensitive Pixels for Light Field Image Sensors With High Spatio-Angular Resolution, IEEE Sensors Journal, vol. 16, Issue: 13, Jul. 2016, 12 pages.

* cited by examiner

IMAGING SYSTEMS AND METHODS FOR DUAL DEPTH AND POLARIZATION SENSING

CROSS REFERENCE TO RELATED PATENT APPLICATIONS

The present application is a national stage application under 35 U.S.C. § 371 of International Application No. PCT/CA2021/051566, filed Nov. 4, 2021, which claims priority to U.S. Provisional Patent Application No. 63/111,888 filed on Nov. 10, 2020. The above-referenced patent applications are incorporated herein by reference in their entirety.

TECHNICAL FIELD

The technical field generally relates to imaging technology, and more particularly, to imaging systems and methods for dual depth and polarization sensing.

BACKGROUND

Traditional imaging techniques involve the projection of three-dimensional (3D) scenes onto two-dimensional (2D) planes, resulting in a loss of information, including a loss of depth information. This loss of information is a result of the nature of square-law detectors, such as charge-coupled devices (CCD) and complementary metal-oxide-semiconductor (CMOS) sensor arrays, which can only directly measure the time-averaged intensity of incident light. A variety of imaging techniques, both active and passive, have been developed that can provide 3D image information, including depth information. Non-limiting examples of 3D imaging techniques include, to name a few, stereoscopic and multiscopic imaging, time of flight, structured light, plenoptic and light field imaging, diffraction-grating-based imaging, and depth from focus or defocus. While each of these imaging techniques has certain advantages, each also has some drawbacks and limitations. Challenges therefore remain in the field of 3D imaging.

SUMMARY

The present description generally relates to imaging systems and methods for dual depth and polarization sensing.

In accordance with an aspect, there is provided an imaging system, including:
 a transmissive diffraction mask (TDM) configured to receive light incident from a scene, the TDM including:
  a first diffraction grating configured to diffract a first portion of the received light to generate first diffracted light, the first diffracted light encoding information indicative of an angle of incidence of the received light; and
  a second diffraction grating configured to diffract a second portion of the received light to generate second diffracted light, the second diffracted light encoding information indicative of the angle of incidence of the received light and a state of polarization of the received light;
 a pixel array including:
  a first set of pixels configured to detect the first diffracted light and generate therefrom a corresponding first set of pixel responses; and
  a second set of pixels configured to detect the second diffracted light and generate therefrom a corresponding second set of pixel responses; and
 a processor configured to:
  receive the first set of pixel responses from the first set of pixels and the second set of pixel responses from the second set of pixels;
  determine, from the first set of pixel responses, angle-of-incidence data conveying the angle of incidence of the received light; and
  determine, from the second set of pixel responses and the angle-of-incidence data determined from the first set of pixel responses, polarization data conveying the state of polarization of the received light.

In some embodiments, the first diffraction grating and the second diffraction grating are configured such that the first diffracted light and the second diffracted light each have, in a near-field diffraction region regime, an intensity profile that is spatially modulated according to the grating period of the respective diffraction grating and that shifts laterally along the grating axis of the respective diffraction grating in response to variations in the angle of incidence of the light received from the scene.

In some embodiments, the first diffraction grating has a first permittivity that determines at least in part a first sensitivity of the first diffraction grating to the state of polarization of the received light; the second diffraction grating has a second permittivity that determines at least in part a second sensitivity of the second diffraction grating to the state of polarization of the received light; and the first permittivity and the second permittivity differ from each other. In some embodiments, the first diffraction grating is substantially insensitive to the state of polarization of the received light. In some embodiments, the first permittivity has a first magnitude, the second permittivity has a second magnitude, and the second magnitude is larger than the first magnitude. In some embodiments, ratio of the second magnitude to the first magnitude is greater than one and less than or equal to 25.

In some embodiments, the first diffraction grating is made of a dielectric material, and the second diffraction grating is made of an electrically conducting material.

In some embodiments, the first diffraction grating, and the second diffraction grating are binary phase gratings. In some embodiments, the first diffraction grating includes a series of alternating ridges and grooves extending along a first grating axis at a first grating period; and the second diffraction grating includes a series of alternating ridges and grooves extending along a second grating axis at a second grating period. In some embodiments, the first set of pixels has a first pixel pitch along the first grating axis, the first pixel pitch being half of the first grating period; the second set of pixels has a second pixel pitch along the second grating axis, the second pixel pitch being half of the second grating period. In some embodiments, the first grating period and the second grating period each range between about 0.1 μm and about 20 μm. In some embodiments, the first grating period is equal to the second grating period. In some embodiments, the first grating axis is parallel to the second grating axis.

In some embodiments, the series of alternating ridges and grooves of the first diffraction grating defines a first duty cycle of the first diffraction grating; the series of alternating ridges and grooves of the second diffraction grating defines a second duty cycle of the second diffraction grating; and the second duty cycle is larger than the first duty cycle.

In some embodiments, the series of alternating ridges and grooves of the first diffraction grating defines a first step height of the first diffraction grating; the series of alternating ridges and grooves of the second diffraction grating defines a second step height of the second diffraction grating; and the second step height is different from the first step height. In some embodiments, a ratio of the second step height to the second grating period is larger than a ratio of the first step height to the first grating period. In some embodiments, the first step height and the second step height each range between about 0.1 µm and about 1 µm.

In some embodiments, the first set of pixels includes a number of first pixel rows extending along the first grating axis, the number of first pixel rows ranging between two and twenty; and the second set of pixels includes a number of second pixel rows extending along the second grating axis, the number of second pixel rows ranging between two and twenty.

In some embodiments, the first diffraction grating is one of a plurality of first diffraction gratings, the plurality of first diffraction gratings being arranged along either a single grating orientation or two orthogonal grating orientations; and the second diffraction grating is one of a plurality of second diffraction gratings, the plurality of second diffraction gratings being arranged along either the single grating orientation or the two orthogonal grating orientations.

In some embodiments, the state of polarization of the received light is a linear polarization state, and the processor is configured to determine, as at least part of the polarization data, a polarization angle with respect to a plane of incidence of the received light on the TDM.

In some embodiments, the processor is configured to generate a depth image of the scene based on the angle-of-incidence data.

In some embodiments, the first set of pixels includes a first subset of pixels and a second subset of pixels, the first set of pixel responses includes a first subset of pixel responses corresponding to the first subset of pixels and a second subset of pixel responses corresponding to the second subset of pixels, the first subset of pixel responses and the second subset of pixel responses varying differently from each other as a function of the angle of incidence of the received light; the second set of pixels includes a first subset of pixels and a second subset of pixels, and the second set of pixel responses includes a first subset of pixel responses corresponding to the first subset of pixels and a second subset of pixel responses corresponding to the second subset of pixels, the first subset of pixel responses and the second subset of pixel responses varying differently from each other as a function of the angle of incidence of the received light. In some embodiments, the processor is configured to determine the angle-of-incidence data conveying the angle of incidence of the received light from a first difference parameter computed between the first subset of pixel responses and the second subset of pixel responses of the first set of pixel responses; and determine the polarization data conveying the state of polarization of the received light from a second difference parameter computed between the first subset of pixel responses and the second subset of pixel responses of the second set of pixel responses and from the angle-of-incidence data determined from the first difference parameter.

In some embodiments, the first subset and the second subset of pixel responses of the first set of pixel responses have magnitudes that respectively increase and decrease as the angle of incidence of the received light increases; and the first subset and the second subset of pixel responses of the second set of pixel responses have magnitudes that respectively increase and decrease as the angle of incidence of the received light increases.

In some embodiments, the first subset of pixels and the second subset of pixels of the first set of pixels are interleaved with each other in an alternating pattern; and the first subset of pixels and the second subset of pixels of the second set of pixels are interleaved with each other in an alternating pattern.

In some embodiments, the imaging system further includes a color filter array interposed between the TDM and the pixel array.

In some embodiments, the TDM and the pixel array are separated from each other by a separation distance, and wherein the separation distance ranges between about 0.2 µm and 20 µm.

In accordance with another aspect, there is provided an imaging method, including:

diffracting light received from a scene using a transmissive diffraction mask (TDM), the TDM including a first diffraction grating and a second diffraction grating, the first diffraction grating being configured to diffract a first portion of the received light to generate first diffracted light, the first diffracted light encoding information indicative of an angle of incidence of the received light, and the second diffraction grating being configured to diffract a second portion of the received light to generate second diffracted light, the second diffracted light encoding information indicative of the angle of incidence of the received light and a state of polarization of the received light;

detecting, with a first set of pixels, the first diffracted light and generating therefrom a corresponding first set of pixel responses;

detecting, with a second set of pixels, the second diffracted light and generating therefrom a corresponding second set of pixel responses;

determining, from the first set of pixel responses, angle-of-incidence data conveying the angle of incidence of the received light; and determining, from the second set of pixel responses and the angle-of-incidence data, polarization data conveying the state of polarization of the received light.

In some embodiments, the imaging method includes providing the first diffraction grating to be substantially insensitive to the state of polarization of the received light.

In some embodiments, the imaging method includes providing the first diffraction grating with a first permittivity that determines at least in part a first sensitivity of the first diffraction grating to the state of polarization of the received light; and providing the second diffraction grating with a second permittivity that determines at least in part a second sensitivity of the second diffraction grating to the state of polarization of the received light, wherein the second permittivity differs from the first permittivity. In some embodiments, the first permittivity has a first magnitude, the second permittivity has a second magnitude, and the second magnitude is larger than the first magnitude. In some embodiments, the imaging method includes providing the first diffraction grating as a dielectric material, and providing the second diffraction grating as an electrically conducting material.

In some embodiments, the imaging method includes providing the first diffraction grating and the second diffraction grating as binary phase gratings. In some embodiments, the imaging method includes providing the first diffraction grating to include a series of alternating ridges and grooves extending along a first grating axis at a first grating period; and providing the second diffraction grating to include a series of alternating ridges and grooves extending along a second grating axis at a second grating period.

In some embodiments, the imaging method includes providing the first set of pixels with a first pixel pitch along the first grating axis, the first pixel pitch being half of the first grating period; and providing the second set of pixels with a second pixel pitch along the second grating axis, the second pixel pitch being half of the second grating period.

In some embodiments, the imaging method includes providing the first diffraction grating with a first duty cycle; and providing the second diffraction grating with a second duty cycle, wherein the second duty cycle is larger than the first duty cycle.

In some embodiments, the imaging method includes providing the first diffraction grating with a first step height; and providing the second diffraction grating with a second step height, wherein a ratio of the second step height to the second grating period is larger than a ratio of the first step height to the first grating period.

In some embodiments, determining the polarization data conveying the state of polarization of the received light includes determining the state of polarization of the received light as a linear polarization state; and determining a polarization angle of the linear polarization state with respect to a plane of incidence of the received light on the TDM.

In some embodiments, the imaging method includes generating a depth image of the scene based on the angle-of-incidence data.

In some embodiments, generating the first set of pixel responses includes generating a first subset of pixel responses corresponding to a first subset of pixels of the first set of pixels; and generating a second subset of pixel responses corresponding to a second subset of pixels of the first set of pixels, wherein the first subset of pixel responses and the second subset of pixel responses vary differently from each other as a function of the angle of incidence of the received light; and generating the second set of pixel responses includes generating a first subset of pixel responses corresponding to a first subset of pixels of the second set of pixels; and generating a second subset of pixel responses corresponding to a second subset of pixels of the second set of pixels, wherein the first subset of pixel responses and the second subset of pixel responses vary differently from each other as a function of the angle of incidence of the received light. In some embodiments, determining the angle-of-incidence data conveying the angle of incidence of the received light includes computing a first difference parameter between the first subset of pixel responses and the second subset of pixel responses of the first set of pixel responses, and obtaining the angle-of-incidence data from the first difference parameter; and determining the polarization data conveying the state of polarization of the received light includes computing a second difference parameter between the first subset of pixel responses and the second subset of pixel responses of the second set of pixel responses, and obtaining the polarization data from the second different parameter and from the angle-of-incidence data determined from the first difference parameter.

In some embodiments, the first subset and the second subset of pixel responses of the first set of pixel responses have magnitudes that respectively increase and decrease as the angle of incidence of the received light increases; and the first subset and the second subset of pixel responses of the second set of pixel responses have magnitudes that respectively increase and decrease as the angle of incidence of the received light increases.

In accordance with another aspect, there is provided a non-transitory computer readable storage medium having stored thereon computer readable instructions that, when executed by a processor, cause the processor to perform a method of imaging a scene, the method including:

receiving a first set of pixel responses and a second set of pixel responses, the first set of pixel responses corresponding to a first portion of light received from the scene and having been diffracted, prior to detection, into first diffracted light encoding information indicative of an angle of incidence of the received light, and the second set of pixel responses corresponding to a second portion of the light received from the scene and having been diffracted, prior to detection, into second diffracted light encoding information indicative of the angle of incidence of the received light and a state of polarization of the received light;

determining, from the first set of pixel responses, angle-of-incidence data conveying the angle of incidence of the received light; and determining, from the second set of pixel responses and the angle-of-incidence data, polarization data conveying the state of polarization of the received light.

In some embodiments, determining the polarization data conveying the state of polarization of the received light includes determining the state of polarization of the received light as a linear polarization state; and determining a polarization angle of the linear polarization state with respect to a plane of incidence of the received light on the TDM.

In some embodiments, the method includes generating a depth image of the scene based on the angle-of-incidence data.

In some embodiments, receiving the first set of pixel responses includes receiving a first subset of pixel responses corresponding to a first subset of pixels of the first set of pixels; and receiving a second subset of pixel responses corresponding to a second subset of pixels of the first set of pixels, wherein the first subset of pixel responses and the second subset of pixel responses vary differently from each other as a function of the angle of incidence of the received light; and receiving the second set of pixel responses includes receiving a first subset of pixel responses corresponding to a first subset of pixels of the second set of pixels; and receiving a second subset of pixel responses corresponding to a second subset of pixels of the second set of pixels, wherein the first subset of pixel responses and the second subset of pixel responses vary differently from each other as a function of the angle of incidence of the received light. In some embodiments, determining the angle-of-incidence data conveying the angle of incidence of the received light computing a first difference parameter between the first subset of pixel responses and the second subset of pixel responses of the first set of pixel responses, and obtaining the angle-of-incidence data from the first difference parameter; and determining the polarization data conveying the state of polarization of the received light includes computing a second difference parameter between the first subset of pixel responses and the second subset of pixel responses of the second set of pixel responses, and obtaining the polarization data from the second different parameter and from the angle-of-incidence data determined from the first difference parameter In accordance with another aspect, there is provided a computer device including a processor; and a non-transitory computer readable storage medium such as described herein, the non-transitory computer readable storage medium being operatively coupled to the processor.

It is appreciated that other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 4 also depicts curves of the sum $I_{sum}=I_+ + I_-$ and the difference $I_{diff}=I_+ - I_-$ of the odd and even pixel responses as functions of θ.

DETAILED DESCRIPTION

Figure 1:
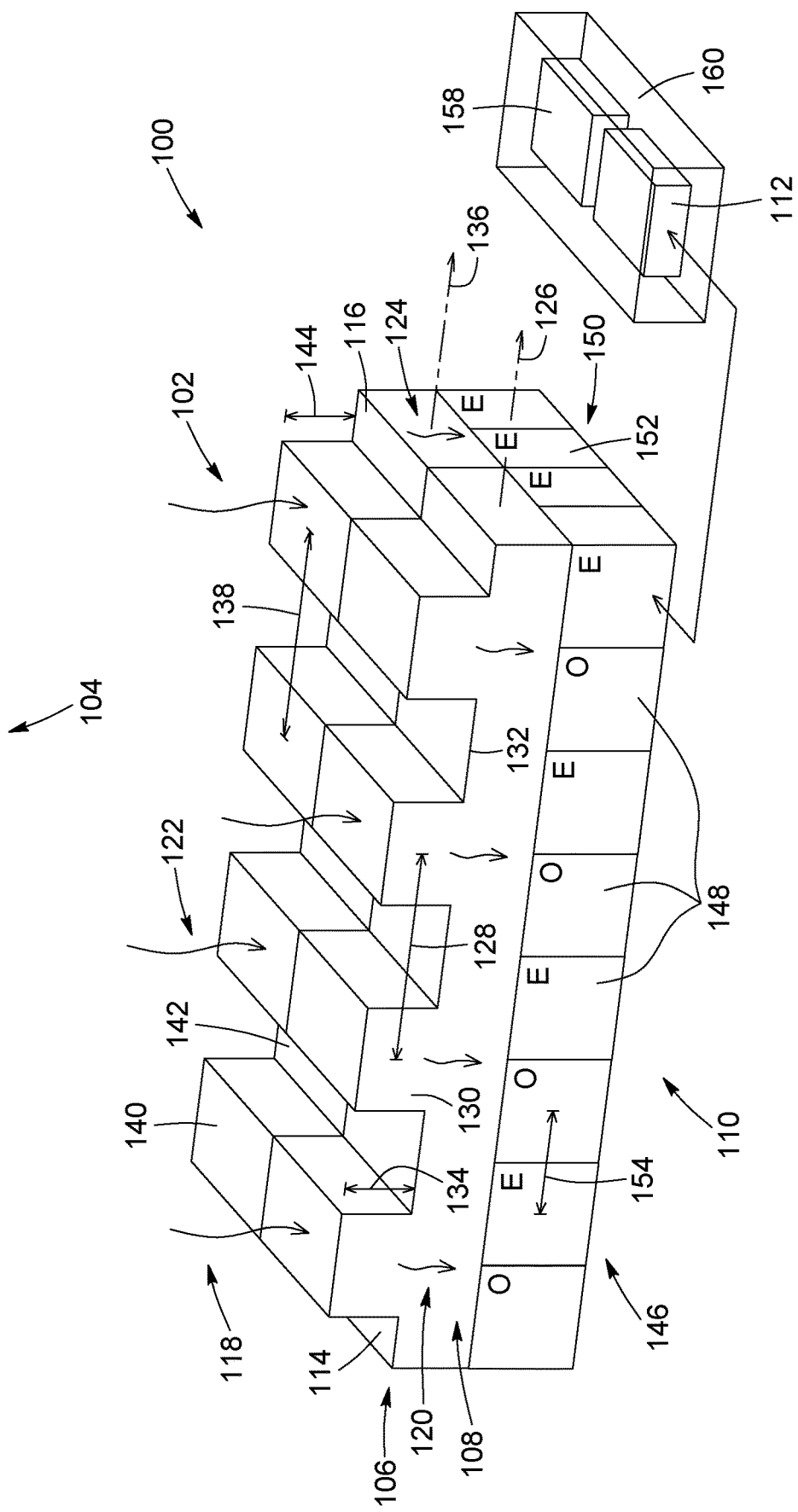
FIG. 1 is a schematic perspective view of an imaging system, in accordance with an embodiment.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", and the like.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. By way of example, in some embodiments, the present techniques may be used with electromagnetic radiation having a center wavelength ranging 175 nanometers (nm) in the deep ultraviolet to about 300 micrometers (μm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. It is appreciated, however, that these wavelength ranges are provided for illustrative purposes, and that the present techniques may operate beyond these ranges.

The present description generally relates to imaging systems and methods enabling passive dual depth and polarization sensing.

The present techniques may be used in various applications that may need or benefit from dual depth and polarization sensing. Non-limiting examples of possible fields of application include, to name a few, consumer electronics (e.g., mobile phones, tablets, laptops, webcams, and notebooks, gaming, virtual and augmented reality, photography), material and surface identification applications, automotive applications (e.g., advanced driver assistance systems, in-cabin monitoring), industrial applications (e.g., inspection, robot guidance, object identification and tracking), and security and surveillance (e.g., biometric anti-spoofing, for example, in facial recognition; motion tracking; traffic monitoring; drones; agricultural inspection with aerial and ground-based drones), corneal-reflection eye tracking, and reflection removal in intensity images and depth maps.

Various aspects and implementations of the present techniques are described below with reference to the figures.

Figure 2:
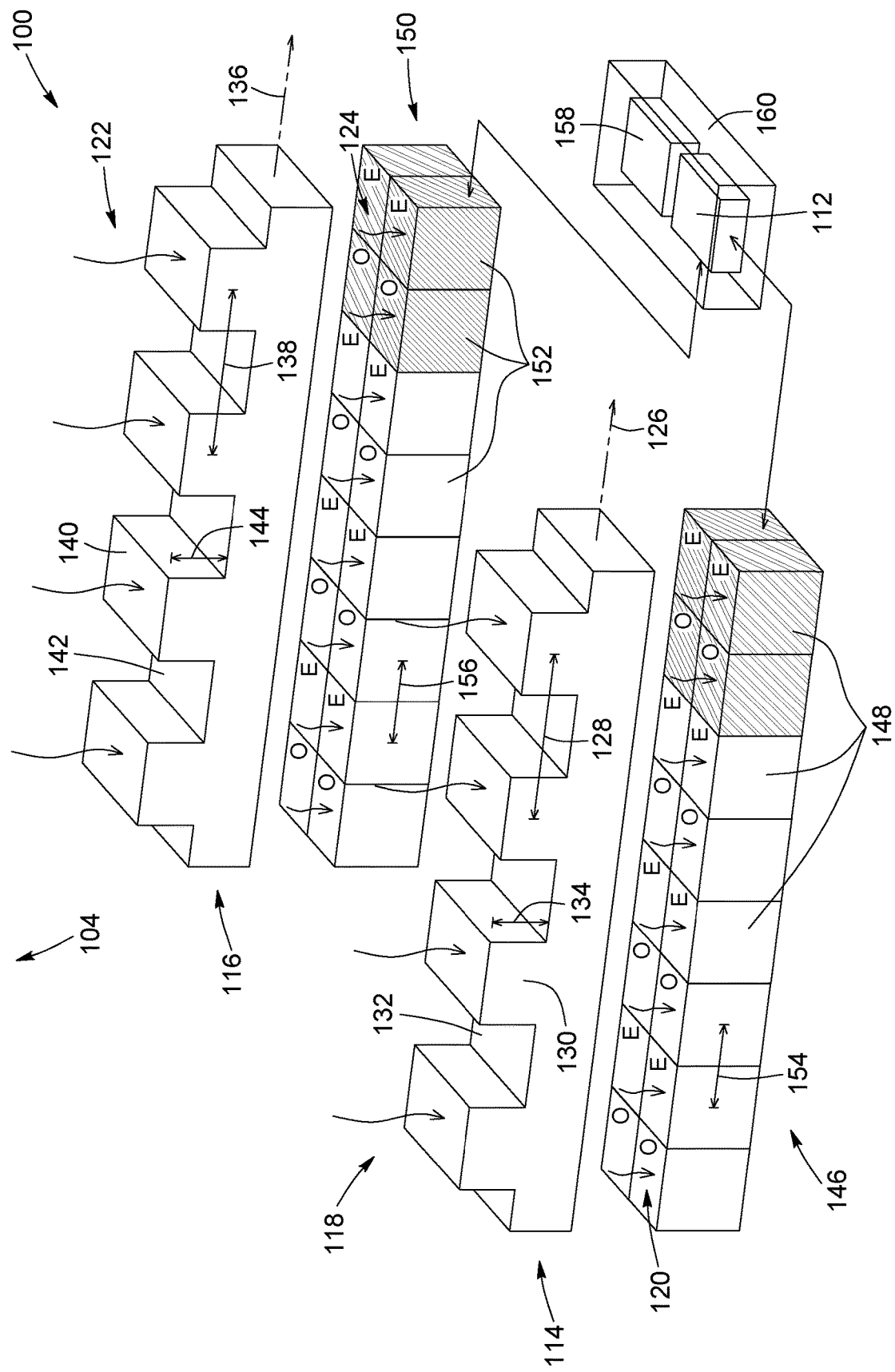
FIG. 2 is a schematic partially exploded perspective view of the imaging system of FIG. 1.

Referring to FIGS. 1 and 2, there is provided a schematic representation of an embodiment of an imaging system 100 for capturing image data representative of light 102 received from a scene 104 within a field of view of the imaging system 100. The captured image data can convey both depth and polarization information about the light 102 received from the scene 104. The term "scene" refers herein to any region, space, surface, environment, object, target, or information of interest which may be imaged according to the present techniques.

The imaging system 100 illustrated in FIGS. 1 and 2 generally includes a transmissive diffraction mask (TDM) 106 configured to diffract the light 102 received from the scene 104 into a diffracted wavefront 108 having encoded therein information about the angle of incidence (AOI) and the state of polarization (SOP) of the received light 102; a pixel array 110 configured to detect the diffracted wavefront 108 and convert the detected diffracted wavefront 108 into image data; and a processor 112 configured to process the image data generated by the pixel array 110 to determine AOI and SOP information about the received light 102. The structure, configuration, and operation of these and other possible components of the imaging system 100 are described in greater detail below.

The provision of the TDM 106 in front of the pixel array 110 can impart 3D imaging capabilities to the imaging system 100, including depth sensing capabilities. This is because the TDM 106 is configured to diffract the light 102 received thereon into a diffracted wavefront 108 whose intensity pattern is spatially modulated in accordance with the angle of incidence of the received light 102. The underlying pixel array 110 is configured to sample on a per-pixel basis the intensity pattern of the diffracted wavefront 108 in the near-field to provide image data conveying information indicative of the angle of incidence of the received light 102. The image data may be used or processed in a variety of ways to provide multiple functions including, but not limited to, 3D depth map extraction, 3D surface reconstruction, image refocusing, and the like. Depending on the application, the image data may be acquired as one or more still images or as a video stream. The structure, configuration, and operation of imaging devices using transmissive diffraction grating structures in front of 2D image sensors to provide 3D imaging capabilities are described in co-assigned international patent applications PCT/CA2017/050686 (published as WO 2017/210781), PCT/CA2018/051554 (published as WO 2019/109182), and PCT/CA2020/050760 (published as WO 2020/243828), as well as in the following master's thesis: Kunnath, Neeth, *Depth from Defocus Using Angle Sensitive Pixels Based on a Transmissive Diffraction Mask* (Master's thesis, McGill University Libraries, 2018). The contents of these four documents are incorporated herein by reference in their entirety. It is appreciated that the theory and applications of such diffraction-based 3D imaging devices are generally known in the art, and need not be described in detail herein other than to facilitate an understanding of the techniques disclosed herein.

In the present techniques, the TDM 106 is configured to encode information not only about the angle of incidence, but also about the state of polarization of the received light 102. To this end, the TDM 106 has a hybrid design that includes a first diffraction grating 114 and a second diffraction grating 116. The first diffraction grating 114 and the second diffraction grating 116 have different sensitivities to the state of polarization of the received light 102, the sensitivity of the second diffraction grating 116 being greater than the sensitivity of the first diffraction grating 114. For example, in the illustrated embodiment, the first diffraction grating 114 is substantially insensitive to the state of polarization of the received light 102, and the second diffraction grating 116 is measurably sensitive to the state of polarization of the received light 102. The first diffraction grating 114 is configured to diffract a first portion 118 of the received light 102 to generate first diffracted light 120, while the second diffraction grating 116 is configured to diffract a second portion 122 of the received light 102 to generate second diffracted light 124. Both the first diffracted light 120 and the second diffracted light 124 encode or convey spatially modulated information indicative of the angle of incidence of the received light 102. In addition, due to the polarization sensitivity of the second diffraction grating 116, the second diffracted light 124 also encodes or conveys information indicative of the state of polarization of the received light 102.

The term "diffraction grating", or simply "grating", refers herein to a structure or material having a spatially modulated optical property and which is configured to spatially modulate the amplitude and/or the phase of an optical wavefront incident thereon. The spatially modulated optical property, for example, a refractive index modulation pattern, defines a grating profile. In some embodiments, a diffraction grating may include a periodic arrangement of diffracting elements, for example, alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation, while in phase gratings, these perturbations are the result of a modulation of the relative group velocity of light caused by a spatial variation of the refractive index of the grating structure or material. In several embodiments disclosed in the present description, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range exist and can be used in some embodiments. Some of the diffraction gratings disclosed herein are polarization-sensitive. Such diffraction gratings can be considered or modeled as anisotropic optical waveguides supporting polarization-dependent propagation of light therethrough.

Referring still to FIGS. 1 and 2, each of the first diffraction grating 114 and the second diffraction grating 116 is a transmission phase grating, specifically a binary phase grating whose grating profile is a two-level, square-wave function. The first diffraction grating 114 has a first grating axis 126, a first grating period 128 along the first grating axis 126, and a first grating profile including a series of ridges 130 periodically spaced-apart at the first grating period 128 along the first grating axis 126, interleaved with a series of grooves 132 also periodically spaced-apart at the first grating period 128 along the first grating axis 126. In such a case, the first grating period 128 corresponds to the sum of the width, along the first grating axis 126, of one ridge 130 and one adjacent groove 132. The first diffraction grating 114 may also be characterized by a duty cycle, defined as the ratio of the ridge width to the first grating period 128, and by a step height 134, defined as the difference in level between the ridges 130 and the grooves 132. The step height 134 may provide a predetermined optical path difference between the ridges 130 and the grooves 132.

The second diffraction grating 116 has a second grating axis 136, a second grating period 138 along the second grating axis 136, and a second grating profile including a series of ridges 140 periodically spaced-apart at the second grating period 138 along the second grating axis 136, interleaved with a series of grooves 142 also periodically spaced-apart at the second grating period 138 along the second grating axis 136.

In such a case, the second grating period 138 corresponds to the sum of the width, along the second grating axis 136, of one ridge 140 and one adjacent groove 142. The second diffraction grating 116 may also be characterized by a duty cycle, defined as the ratio of the ridge width to the second grating period 138, and by a second step height 144, defined as the difference in level between the ridges 140 and the grooves 142.

In the illustrated embodiment, the first diffraction grating 114 and the second diffraction grating 116 have parallel grating axes 126, 136 and identical grating profiles, including identical grating periods 128, 138. However, this need not be the case in other embodiments. For example, in some embodiments, the first and second diffraction gratings 114, 116 can have grating axes 126, 136 that are perpendicular to each other. In some embodiments, the first and second grating periods 128, 138 each range between about 0.1 µm and about 20 µm, and the first and second step heights 134, 144 each range between about 0.1 µm and about 1 µm, although values outside these ranges can be used in other embodiments. In the illustrated embodiment, the first and second diffraction gratings 114, 116 both have a duty cycle equal to 50%, but values different from 50% may be used in other embodiments. Depending on the application, the grooves 132, 142 may be empty or filled with a material having a refractive index different from that of the ridge material.

The pixel array 110 is configured to receive and detect the diffracted wavefront 108 produced by the TDM 106. The term "pixel array" refers herein to sensor array made up of a plurality of photodetectors, referred to herein as pixels, which are configured to detect electromagnetic radiation incident thereon from a scene and convert the detected radiation into electrical signals, which may be processed to generate an image of the scene. It is appreciated that the pixel array 110 may be configured to detect electromagnetic radiation in any appropriate region of the spectrum. Each pixel may be configured to convert the spatial portion of the diffracted wavefront 108 incident thereon into accumulated charge, the amount of which is proportional to the amount of light collected and recorded by the pixel. Each pixel generally includes a light-receiving surface and associated pixel circuitry for processing signals at the pixel level and communicating with other electronics, such as a readout unit. In general, each pixel may be individually addressed and read out.

In some embodiments, the pixel array 110 includes a CMOS or a CCD image sensor, but other types of photodetector arrays (e.g., charge injection devices or photodiode arrays) may also be used. Depending on the application, the pixel array 110 may operate according to a rolling or a global shutter readout scheme. The pixel array 110 may further be part of a stacked, backside, or frontside illumination sensor architecture. The pixel array 110 may also include a contrast or a phase-detection autofocus mechanism. It is appreciated that the imaging system 100 may be implemented using various image sensor architectures and pixel array configurations. In some embodiments, the imaging system 100 may be implemented by adding or coupling the TDM 106 on top of an already existing image sensor including a pixel array. For example, the existing image sensor may be a conventional CMOS or CCD imager. However, in other embodiments, the imaging system 100 may be implemented and integrally packaged as a separate, dedicated, and/or custom-designed device incorporating therein all or most of its components, including the TDM 106 and the pixel array 110.

In the embodiment illustrated in FIGS. 1 and 2, the pixel array 110 includes a first set 146 of pixels 148 disposed below the first diffraction grating 114 and a second set 150 of pixels 152 disposed below the second diffraction grating 116. The first set 146 of pixels 148 is configured to detect the first diffracted light 120 produced by the first diffraction grating 114 and generate therefrom a corresponding first set of pixel responses. The second set 150 of pixels 152 is configured to detect the second diffracted light 124 produced by the second diffraction grating 116 and generate therefrom a corresponding second set of pixel responses.

In the pixel array 110 illustrated in FIGS. 1 and 2, the pixels 148, 152 are arranged into a rectangular grid of rows and columns defined by two orthogonal pixel axes, although other arrangements may be used on other embodiments. The number of rows and columns defines the resolution of the pixel array 38. FIGS. 1 and 2 depict a 8×4 pixel array 110 for simplicity and ease of illustration. In practice, however, the number of pixels 148, 152 is generally significantly larger. For example, in some embodiments, the pixel array 110 includes from about 1080×1920 to about 6000×8000 pixels. However, many other sensor configurations, with different pixel arrangements, aspect ratios, and/or fewer or more pixels, are contemplated. Depending on the application, the pixels 148, 152 may or may not be all identical. It is also appreciated that while the pixels 148, 152 are square in the embodiment of FIGS. 1 and 2, other pixel shapes may be used in other embodiments.

In the pixel array 110 illustrated in FIGS. 1 and 2, the first set 146 of pixels 148 includes two first pixel rows extending along the first grating axis 126, and the second set 150 of pixels 152 includes two second pixel rows extending along the second grating axis 136. However, in other embodiments, the number of first and second pixel rows can range from two to twenty. The number of first pixel rows may or may not be the same as the number of second pixel rows.

The first set 146 of pixels 148 and the second set 150 of pixels 152 may be characterized by a first pixel pitch 154 and a second pixel pitch 156, respectively. The term "pixel pitch" refers herein to the center-to-center distance between nearest-neighbor pixels. In some embodiments, the first and second pixel pitches 154, 156 range between about 0.7 µm and about 10 µm, although other pixel pitch values may be used in other embodiments.

The first pixel pitch 154 is defined along the first grating axis 126, and the second pixel pitch 156 is defined along the second grating axis 136. In the illustrated embodiment, the first pixel pitch 154 and the second pixel pitch 156 are identical, although this need not be the case in other embodiments. Depending on the application, the first pixel pitch 154 may be less than, equal to, or greater than the first grating period 128, and likewise, the second pixel pitch 156 may be less than, equal to, or greater than the second grating period 138.

For example, in the illustrated embodiment, the first pixel pitch 154 is equal to half of the first grating period 128 (i.e., the first grating period 128 is twice as large as the first pixel pitch 154) and the second pixel pitch 156 is equal to half of the second grating period 138 (i.e., the second grating period 138 is twice as large as the second pixel pitch 156). However, other grating-period-to-pixel-pitch ratios may be used in other embodiments. Non-limiting examples of possible ratio values R include, to name a few, R≥2; R=(n+1), where n is a positive integer; R=2n, where n is a positive integer; R=1; R=2/(2n+1), where n is a positive integer, for example, n=1 or 2; and R=n/m, where n and m are positive integers larger than two and m>n, for example, n=3 and m=4.

In the embodiment illustrated in FIGS. 1 and 2, the first diffraction grating 114 is disposed over the first set 146 of pixels 148 such that the center of each ridge 130 is vertically aligned with the midpoint between adjacent pixels 148, and likewise for the center of each groove 132. Similarly, the second diffraction grating 116 is disposed over the second set 150 of pixels 152 such that the center of each ridge 140 is vertically aligned with the midpoint between adjacent pixels 152, and likewise for the center of each groove 142. It is appreciated that different configurations are possible in other embodiments. For example, in some embodiments, the degree of vertical alignment between the TDM 106 and the pixel array 110 may be adjusted in accordance with a chief ray angle (CRA) characteristic associated with the imaging system 100. In such a case, the vertical alignment between the first diffraction grating 114 and the first set 146 of pixels 148, and likewise for the vertical alignment between the second diffraction grating 116 and the second set 150 of pixels 152, may change as a function of position within the pixel array 110, for example, as one goes from the center to the edge of the pixel array 110. This means, for example, that depending on its position within the pixel array 110, a given pixel 148, 152 may be vertically aligned with a center of a ridge 130, 140, a center of a groove 132, 142, a transition between a ridge 130, 140 and a groove 132, 142, or some intermediate position of the corresponding overlying diffraction grating 114, 116.

Referring still to FIGS. 1 and 2, the processor 112 is operatively coupled to the pixel array 110 to receive therefrom the first and second sets of pixel responses. As described in greater detail below, the processor 112 is configured to determine, from the first set of pixel responses, AOI data conveying the angle of incidence of the received light 102. The processor 112 is also configured to determine, from the second set of pixel responses and the AOI data determined from the first set of pixel responses, polarization data conveying the state of polarization of the received light 102.

The processor 112, along with a memory 158, may be part of a computer device 160. The computer device 160 may be provided within one or more general purpose computers and/or within any other suitable computer devices, implemented in hardware, software, firmware, or any combination thereof, and connected to various components of the imaging system 100 via appropriate wired and/or wireless communication links and interfaces. Depending on the application, the computer device 160 may be fully or partly integrated with, or physically separate from, the other components of the imaging system 100.

The processor 112 may implement operating systems and may be able to execute computer programs, also known as commands, instructions, functions, processes, software codes, executables, applications, and the like. While the processor 112 is depicted in FIGS. 1 and 2 as a single entity for illustrative purposes, the term "processor" should not be construed as being limited to a single processor, and accordingly, any known processor architecture may be used. In some embodiments, the processor 112 may include a plurality of processing units. Such processing units may be physically located within the same device, or the processor 112 may represent the processing functionalities of a plurality of devices operating in coordination. For example, the processor 112 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 158, which may also be referred to as a "computer readable storage medium" is capable of storing computer programs and other data to be retrieved by the processor 112. The terms "computer readable storage medium" and "computer readable memory" refer herein to a non-transitory and tangible computer product that can store and communicate executable instructions for the implementation of various steps of the techniques disclosed herein. The computer readable storage medium 158 may be any computer data storage device or assembly of such devices, including a random-access memory (RAM); a dynamic RAM; a read-only memory (ROM); a magnetic storage device, such as a hard disk drive, a floppy disk, and a magnetic tape; an optical storage device, such as a compact disc (CD or CDROM), a digital video disc (DVD), and a Blu-Ray™ disc; a solid state drive, such as a flash drive memory; and/or any other non-transitory memory technologies. The computer readable storage medium 158 may be associated with, coupled to, or included in the processor 112, and the processor 112 may be configured to execute instructions contained in a computer program stored in the computer readable storage medium 158 and relating to various functions and operations associated with the processor 112.

Figure 3A:
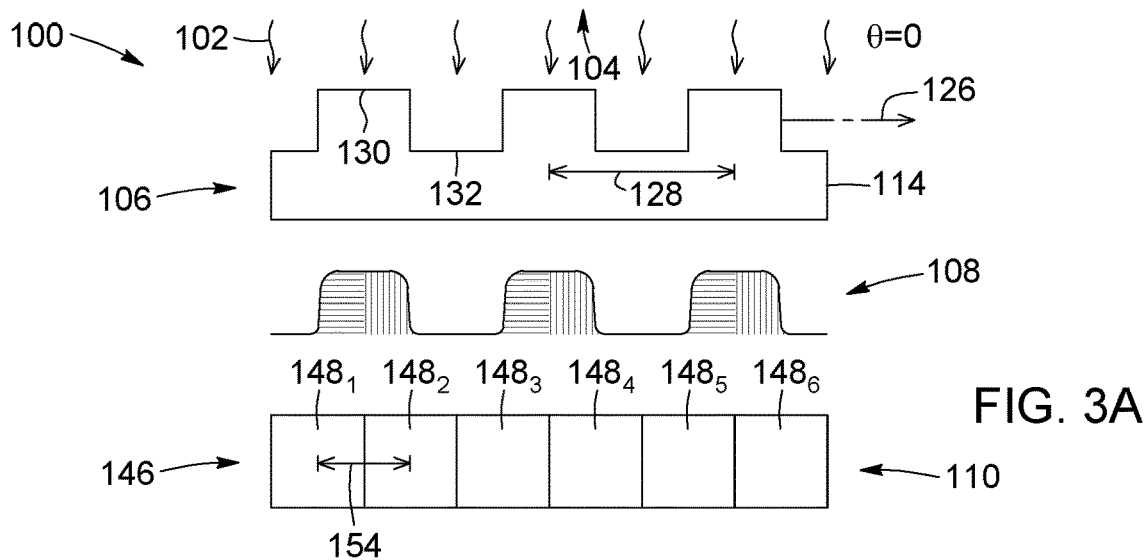
FIGS. 3A to 3C are schematic representations of an example of an imaging system including a transmissive diffractive mask and receiving light with three different angles of incidence θ: normal incidence, θ=0 (FIG. 3A); oblique incidence, θ=θ$_{max}$>0 (FIG. 3B); and oblique incidence, θ=-θ$_{max}$<0 (FIG. 3C).
Figure 3B:
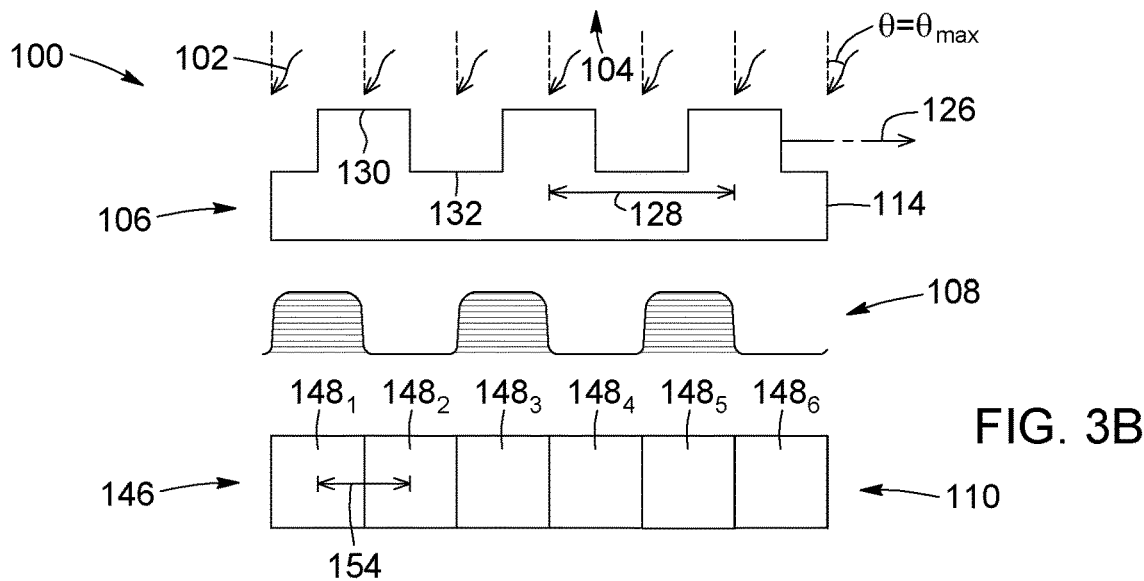
Figure 3C:
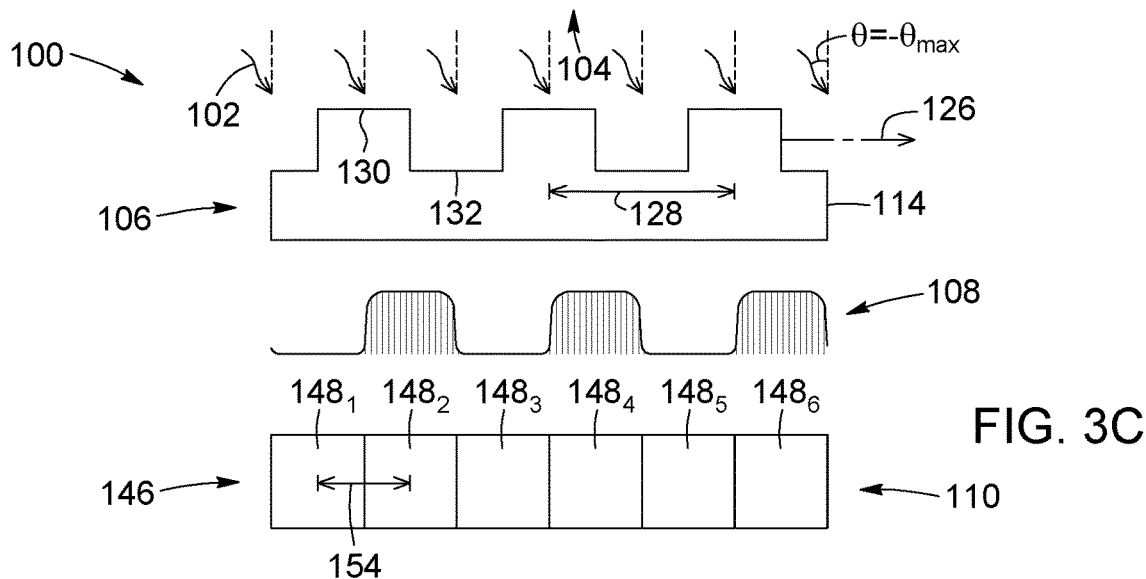

Referring to FIGS. 3A to 3C, the operation of TDM-based imaging systems and how they can be used to provide depth sensing capabilities will be described in greater detail. FIGS. 3A to 3C are schematic representations of an example of an imaging system 100 receiving light 102 with three different angles of incidence θ from an observable scene 104 (FIG. 3A: normal incidence, θ=0; FIG. 3B: oblique incidence, θ=θ$_{max}$>0; and FIG. 3C: oblique incidence, θ=−θ$_{max}$<0). The imaging system 100 includes a TDM 106 and a pixel array 110 disposed under the TDM 106. The TDM 106 includes a binary phase diffraction grating 114 having a grating axis 126 and a grating profile having a grating period 128 and including alternating ridges 130 and grooves 132 with a duty cycle of 50%. The pixel array 110 includes a set 146 of pixels 148$_1$-148$_6$. The diffraction grating 114 is disposed over the pixels 148$_1$-148$_6$ such that the center of each ridge 130 is vertically aligned with the midpoint between adjacent ones of the pixels 148$_1$-148$_6$, and likewise for the center of each groove 132. The grating period 128 is twice as large as the pixel pitch 154.

In operation of the imaging system 100, the diffraction grating 114 receives the light 102 from the scene 104 on its input side, and diffracts the received light 102 to generate, on its output side, a diffracted wavefront 108 that propagates toward the pixel array 110 for detection by the pixels 148$_1$-148$_6$. The diffracted wavefront 108 has an intensity pattern that is spatially modulated based, inter alia, on the geometrical and optical properties of the diffraction grating 114, the angle of incidence θ of the received light 102, and the position of the observation plane (e.g., the pixel array 110, or an intermediate optical component, such as a microlens array, configured to relay the diffracted wavefront 108 onto the pixel array 110). In the illustrated example, the observation plane corresponds to the light-receiving surface of the pixel array 110. It is assumed that the operation of the diffraction grating 114 illustrated in FIGS. 3A to 3C is substantially achromatic and insensitive to the state of polarization of the received light 102.

The TDM 106 and the pixel array 110 may be disposed relative to each other such that the light-receiving surface of the pixel array 110 is positioned in the near-field diffraction region of the diffraction grating 114. For example, in order to detect the diffracted wavefront 108 in the near-field, the separation distance between the grating profile of the diffraction grating 114, where the diffracted wavefront 108 is formed, and the light-receiving surface of the pixel array 110, where the diffracted wavefront 108 is detected, may range between about 0.2 μm and about 20 μm, such as between about 0.5 μm and about 8 μm if the center wavelength of the received light 102 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T = \lambda/[1-(1-\lambda^2/g^2)^{1/2}]$, where λ is the wavelength of the light incident on the grating. This expression simplifies to $z_T = 2g^2/\lambda$ when g is sufficiently large compared to λ. Other self-images are observed at integer multiples of the half Talbot length, that is, at $nz_T/2$. These additional self-images are either in-phase and out-of-phase by half of the grating period with respect to the self-image observed at $z_T$, depending on whether n is even or odd, respectively. Further sub-images with smaller periods can also be observed at smaller fractional values of the Talbot length. These self-images are observed in the case of amplitude gratings. In the case of phase gratings, such as the one depicted in FIGS. 3A to 3C, it is the phase of the grating that is self-imaged at integer multiples of the half-Talbot length, which cannot be observed using intensity-sensitive photodetectors, such as photodiodes. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns, which are sometimes referred to as Lohmann images, can be detected with intensity-sensitive photodetectors.

In the example illustrated in FIGS. 3A to 3C, the diffraction grating 114 and the pixel array 110 are positioned relative to each other so as to detect these Talbot-like, near-field intensity patterns formed at observation planes corresponding to non-integer multiples of the half-Talbot distance (i.e. Lohman images), for example, at $z_T/4$ or $3z_T/4$. In such a case, the diffraction grating 114 is configured to generate, in the observation plane, a diffracted wavefront 108 having an intensity pattern that is spatially modulated according to the grating period 128. As depicted in FIGS. 3A to 3C, the intensity pattern of the diffracted wavefront 108 has a spatial period that matches or relates to the grating period 128 and a shape that matches or relates to the grating profile of the diffraction grating 114. In FIGS. 3A to 3C, the spatial period of the intensity pattern of the diffracted wavefront 108 is substantially equal to the grating period 128. However, in other scenarios, the spatial period of the intensity pattern of the diffracted wavefront 108 may be a rational fraction of the grating period 128, such as half of the grating period 128 in the case of doubled Lohmann images. Each of the pixels $148_1$-$148_6$ of the pixel array 110 is configured to sample a respective portion of the intensity pattern of the diffracted wavefront 108 and to generate therefrom a corresponding intensity-based pixel response. In FIGS. 3A to 3C, the horizontally hatched portions of the intensity pattern of the diffracted wavefront 108 are sampled by the odd pixels $148_1$, $148_3$, $148_5$, while the vertically hatched portions are sampled by the even pixels $148_2$, $148_4$, $148_6$.

Another property of Lohmann self-images is that they shift laterally along the grating axis 126 upon varying the angle of incidence θ of the received light 102, while substantially retaining their period and shape. This can be seen from a comparison between the intensity pattern of the diffracted wavefronts 108 illustrated in FIGS. 3A to 3C. The diffraction grating 114 is configured to impart an asymmetric angle-dependent spatial modulation to the intensity pattern of the diffracted wavefront 108, which is sampled by the pixels $148_1$-$148_6$. By controlling the vertical alignment between the diffraction grating 114 and the pixel array 110 and the relationship between the grating period 128 and the pixel pitch 154, the intensities measured by the individual pixels $148_1$-$148_6$ for a given intensity of the received light 102 will vary as a function of the angle of incidence θ due to the lateral shifts experienced by the diffracted wavefront 108. For example, in FIGS. 3A to 3C, the intensities measured by the odd pixels $148_1$, $148_3$, $148_5$ are respectively equal to (FIG. 3A), greater than (FIG. 3B), and less than (FIG. 3C) the intensities measured by the even pixels $148_2$, $148_4$, $148_6$. The angle-dependent information encoded by the diffraction grating 114 into the intensity pattern of the diffracted wavefront 108 recorded by the pixel array 110 as a set of individual intensity-based pixel responses may be decoded to provide depth information about the scene 104.

Figure 4:
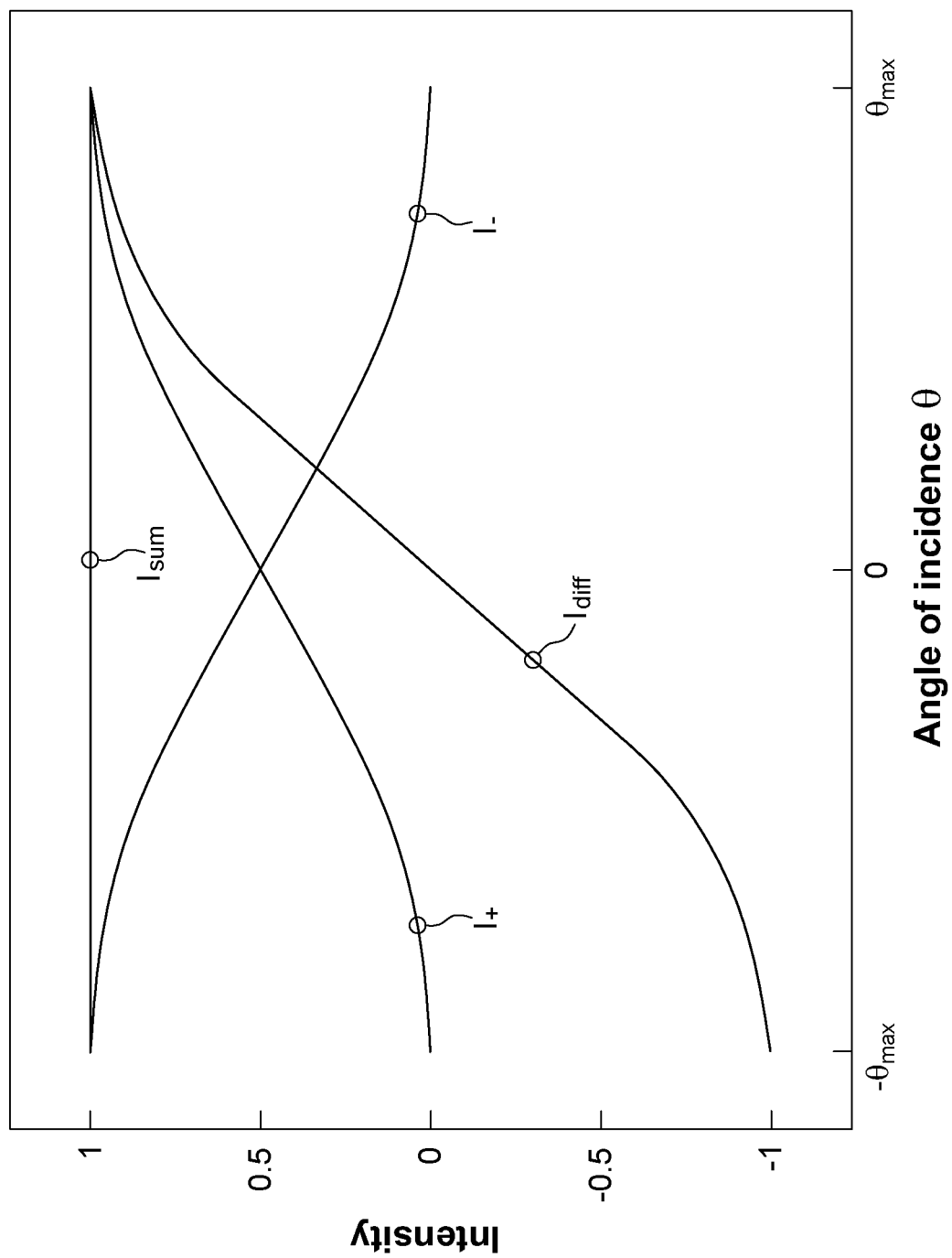
FIG. 4 is a graph depicting curves of the individual pixel responses of the odd pixels ($I_+$) and the even pixels ($I_-$) of the imaging system illustrated in FIGS. 3A to 3C, plotted as functions of the angle of incidence θ, for a given intensity of incident light.

Referring to FIG. 4, there are depicted curves of the individual pixel responses of the odd pixels $148_1$, $148_3$, $148_5$ ($I_+$) and the even pixels $148_2$, $148_4$, $148_6$ ($I_-$) of FIGS. 3A to 3C plotted as functions of the angle of incidence θ, for a given intensity of incident light. FIG. 4 assumes that the intensity of the incident light is equal to one and that there is a modulation depth of substantially 100% between $\theta=\pm\theta_{max}$, where the maxima of the diffracted intensity pattern are centered on either the odd pixels $148_1$, $148_3$, $148_5$ or the even pixels $148_2$, $148_4$, $148_6$ (peak modulated level), and θ=0, where the maxima of the diffracted intensity pattern are centered on the transitions between the odd pixels $148_1$, $148_3$, $148_5$ and the even pixels $148_2$, $148_4$, $148_6$ (unmodulated level). It is seen that $I_+$ and have complementary asymmetrical angular responses, where $I_-(\theta)=I_+(-\theta)$ and where $I_+$ and $I_-$ respectively increases and decreases as θ increases.

FIG. 4 also depicts curves of the sum $I_{sum}=I_++I_-$ and the difference $I_{diff}=I_+-I_-$ of the odd and even pixel responses as functions of θ. It is appreciated that since the intensities $I_+$ and $I_-$ vary in a complementary way as a function of θ, their sum $I_{sum}$ remains, in principle, independent of θ. In practice, $I_{sum}$ can be controlled to remain largely independent of θ, or at least symmetrical with respect to θ (i.e., so that $I_{sum}(\theta)=I_{sum}(-\theta)$). The summed pixel response, $I_{sum}$, is similar to the signal that would be obtained by the pixels $148_1$-$148_6$ in the absence of the diffraction grating 114, and thus can provide 2D intensity image information, with no or little angle-dependent information encoded therein. The differential pixel response, $I_{diff}$, varies asymmetrically as a function of θ and represents a measurement of the angle-of-incidence information encoded into the diffracted wavefront 108 by the diffraction grating 114. The pixel responses $I_+$, $I_-$, $I_{sum}$, and $I_{diff}$ may be expressed mathematically as follows:

$$I_\pm(\theta) = \frac{I_0}{2}[1 \pm m\sin(\beta\theta)], \quad (1)$$

$$I_{sum} = I_0, \quad (2)$$

$$I_{diff}(\theta) = I_0\, m\sin(\beta\theta), \quad (3)$$

where $I_0$ is the intensity of the incident light, m is a modulation depth parameter, and β is an angular sensitivity parameter. It is noted that m=1 and $\beta=1/\theta_{max}$ in FIG. 4. It is also noted that the expressions for the intensity-based pixel responses $I_+$ and $I_-$ in Equation (1) are not exact relationships. However, they can provide convenient analytical expressions that are adequately representative of how I+ and may vary as a function of the angle of incidence.

The summed and differential pixel responses, $I_{sum}$ and $I_{diff}$, may be processed to provide depth sensing capabilities. In particular, the summed and differential pixel responses $I_{sum}$ and $I_{diff}$ from all the odd-even pixel pairs ($I_+$, $I_-$) may be used to provide a TDM disparity map. The TDM disparity map $d_{TDM}$ is made of a set of TDM disparities, one for each odd-even pixel pair (or TDM pixel pair). The TDM disparity map is representative of the difference between the viewpoint of the scene 104 provided by the odd pixels $148_1$, $148_3$, $148_5$ and the viewpoint of the scene 104 provided by the even pixels $148_2$, $148_4$, $148_6$. In other words, the odd pixel responses $I_+$ and the even pixel responses $I_-$ can provide two slightly different views of the scene 104, separated by an effective baseline distance, referred to herein as the TDM baseline distance $b_{TDM}$. The TDM baseline distance can depend, inter alia, on the modulation depth parameter m and the numerical aperture of the imaging optics disposed in front of the TDM 106. It is appreciated that the TDM baseline distance is generally smaller than stereoscopic baseline distances of conventional stereoscopic imaging systems (e.g., including a pair of imaging devices or cameras).

The TDM disparity map can be processed to generate a depth map of the scene 104. For example, in some embodiments, the absolute depth, $z_d$, of an object in the scene 104 can be related to the TDM disparity $d_{TDM}$ as follows:

$$d_{TDM} = S_{TDM}\left(\frac{1}{z_d} - \frac{1}{z_f}\right), \quad (4)$$

where $S_{TDM}$ is a depth sensitivity parameter associated with the TDM 106, and $z_f$ is the focus distance of the imaging system 100, that is, the distance of the object plane that is imaged in-focus by the imaging system 100.

Returning to FIGS. 1 and 2, the operation of the first diffraction grating 114 is assumed to be substantially achromatic and insensitive to the state of polarization of the received light 102, as depicted in FIGS. 3A to 3C. In such a case, the first set 146 of pixels 148 can be said to include a first subset of pixels (e.g., first odd pixels 148$_O$ in FIGS. 1 and 2) and a second subset of pixels (e.g., first even pixels 148E in FIGS. 1 and 2). The first odd pixels 148$_O$ and the first even pixels 148$_E$ are configured to sample complementary portions of the first diffracted light 120 over a full period thereof. This means that the first set of pixel responses includes a first subset of pixel responses $I_+(\theta)$ corresponding to the first subset of pixels (i.e., the odd pixels 148$_O$) and a second subset of pixel responses $I_-(\theta)$ corresponding to the second subset of pixels (i.e., the even pixels 148$_E$), the first subset of pixel responses $I_+(\theta)$ and the second subset of pixel responses $I_-(\theta)$ varying differently from each other as a function of the angle of incidence $\theta$ of the received light 102. In some embodiments, the pixel responses $I_+$ of the first odd pixels 148$_O$ and the pixel responses of the first even pixels 148$_E$ can be described by Equation (1).

Using Equations (2) and (3), the processor 112 in FIGS. 1 and 2 may be configured to compute, from the first odd and even pixel responses $I_+$ and $I_-$, first summed pixel responses, $I_{sum}$, and first differential pixel responses, $I_{diff}$, respectively. The processor 112 may also be configured to determine the AOI data conveying the angle of incidence $\theta$ of the received light 102 from a first difference parameter computed between the first subset of pixel responses $I_-(\theta)$ and the second subset of pixel responses $I_+(\theta)$ of the first set of pixel responses. The first difference parameter may be based on $I_{diff}$ or on both $I_{sum}$ and $I_{diff}$. The first difference parameter represents a difference in angular viewpoints between the first subset of pixel responses $I_+$ of the first odd pixels 148$_O$ and the second subset of pixel responses of the first even pixels 148$_E$. The processor 112 may also be configured to determine a depth image of the scene 104 based on the AOI data.

It is appreciated that Equations (2) and (3) imply that each first summed pixel response $I_{sum}$ is obtained by summing one first odd pixel response $I_+$ and one first even pixel response $I_-$, and that each first differential pixel response $I_{diff}$ is obtained by subtracting one first odd pixel response $I_+$ from one first even pixel response $I_-$. Such an approach may be viewed as a 2×1 binning mode. However, other approaches can be used to determine the sets of first summed and differential pixel responses $I_{sum}$ and $I_{diff}$, for example, a 2×2 binning mode (e.g., $I_{sum}=I_{+(i)}+I_{-(i)}+I_{+(j)}+I_{-(j)}$ and $I_{diff}=I_{+(i)}-I_{-(i)}+I_{+(j)}-I_{-(j)}$, where $I_{\pm(i)}$ is a first pair of first odd and even pixel responses and $I_{\pm(j)}$ is an adjacent second pair of first odd and even pixel responses and), or a convolution mode (e.g., using a kernel such that $I_{sum}$ and $I_{diff}$ have the same pixel resolution as $I_+$ and $I_-$). In this regard, the term "differential" is used herein to denote not only a simple subtraction between two pixel responses, but also a more complex differential operation from which a difference between two or more pixel responses is obtained. It is also appreciated that although the embodiment of FIGS. 1 and 2 defines two groups of first pixels 148 with different pixel responses as a function of the angle of incidence (i.e., the first odd pixels 148$_O$ and the first even pixels 148$_E$), other embodiments may define groups composed of more than two pixels with different angular responses.

Referring still to FIGS. 1 and 2, in contrast to the first diffraction grating 114, the second diffraction grating 116 is sensitive to the both the angle of incidence and the state of polarization of the incident light 102. This means that the second diffracted light 124 produced by the second diffraction grating 116 encodes information indicative of both the angle of incidence of the received light 102 and a state of polarization of the received light 102. The second diffracted light 124 is sampled by the second set 150 of pixels 152. In the illustrated embodiment, the second set 150 of pixels 152 can also be said to include a first subset of pixels (e.g., second odd pixels 152$_O$ in FIGS. 1 and 2) and a second subset of pixels (e.g., second even pixels 152$_E$ in FIGS. 1 and 2). Due to the polarization-dependent response of the second diffraction grating 116, the pixel responses $I_+^*$ of the second odd pixels 152$_O$, the pixel responses $I_-^*$ of the second even pixels 152$_E$, and the corresponding second summed pixel responses, $I_{sum}^*=I_+^*+I_-^*$ and second differential pixel responses, $I_{diff}^*=I_+^*-I_-^*$, may be written as follows:

$$I_\pm^*(\theta, S) = \frac{I_0\alpha(S)}{2}\{1 \pm m(S)\sin[\beta(S)\theta]\}, \quad (5)$$

$$I_{sum}^*(S) = I_0\alpha(S), \quad (6)$$

$$I_{diff}^*(\theta, S) = I_0\alpha(S)\, m(S)\sin[\beta(S)\theta], \quad (7)$$

where the parameters $\alpha(S)$, $m(S)$, and $\beta(S)$ depend, in general, on the state of polarization S of the light 102 received from the scene 104. Here, the parameter a(S) is a polarization-dependent factor that affects equally the angle-independent and the angle-dependent terms of $I_+^*$ and $I_-^*$. It is noted that when a varies as a function of polarization, information about the state of polarization of a flat field (i.e., a uniform scene without depth cues such as edges and textures) may be obtained in the absence of depth information. As for Equation (1), it is appreciated that the expressions for intensity-based pixel responses $I_+^*$ and $I_-^*$ in Equation (5) are not exact relationships. However, they can provide convenient analytical expressions that are adequately representative of how $I_+^*$ and $I_-^*$ vary as a function of the angle of incidence and the state of polarization of the incident light 102.

Equations (6) and (7) imply that each second summed pixel response $I_{sum}^*$ is obtained by summing one second odd pixel response $I_+^*$ and one second even pixel response $I_-^*$ and that each second differential pixel response $I_{diff}^*$ is obtained by subtracting one second odd pixel response $I_+^*$ from one second even pixel response $I_-^*$. However, as noted above for the sets of first summed and differential pixel responses, $I_{sum}$ and $I_{diff}$, other approaches can be used to determine the sets of second summed and differential pixel responses $I_{sum}^*$ and $I_{diff}^*$. Furthermore, also as for the $I_{sum}$ and $I_{diff}$, although the embodiment of FIGS. 1 and 2 defines two groups of second pixels 152 with different pixel responses as a function of the angle of incidence (i.e., the second odd pixels $152_O$ and the second even pixels $152_E$), other embodiments may define groups composed of more than two pixels with different angular responses.

Figure 5:
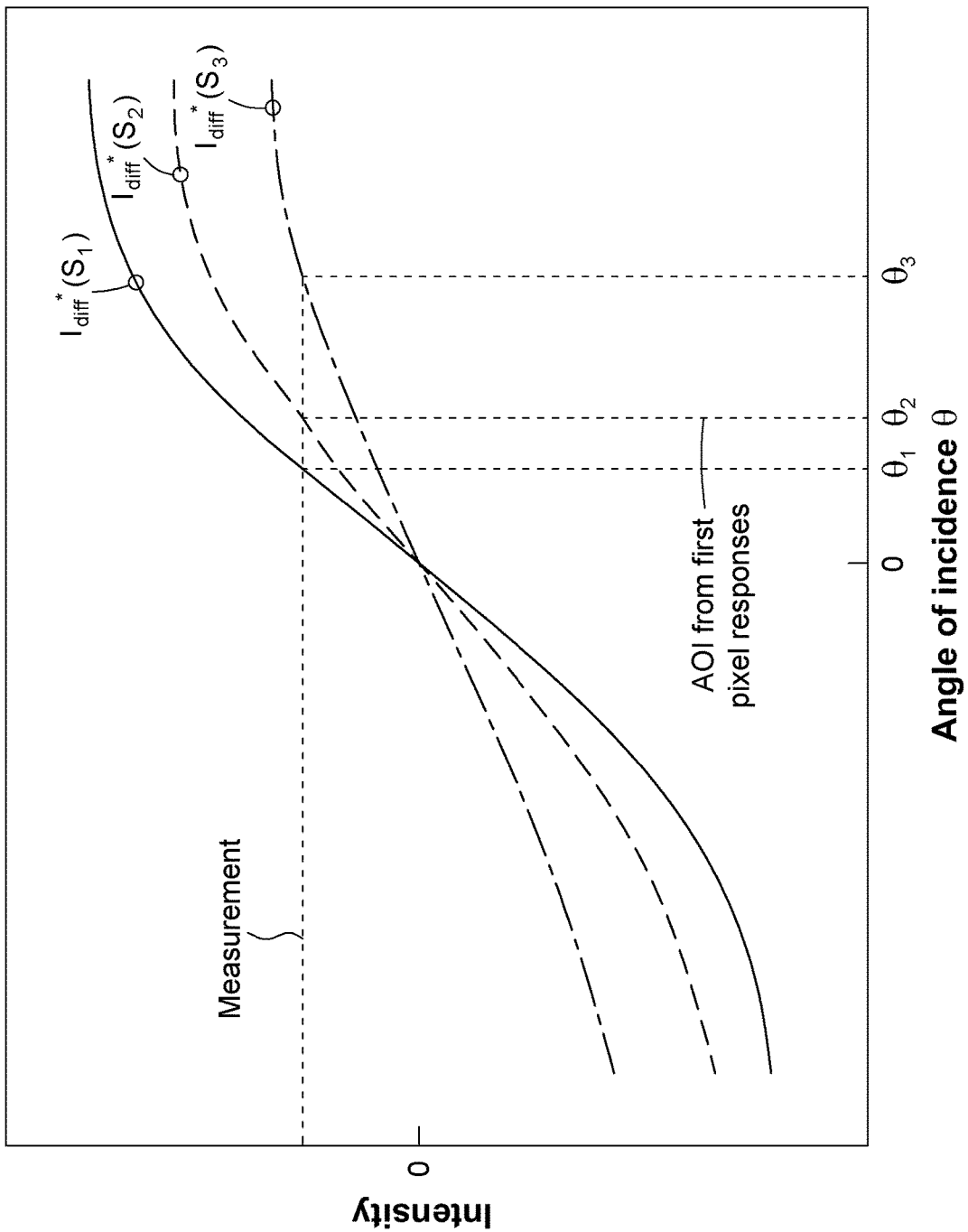
FIG. 5 is a graph depicting three curves of the differential pixel response $I_{diff}^*$ plotted as functions of the angle of incidence θ, for a given intensity of incident light. The three curves correspond to three different states of polarization, $S_1$, $S_2$, and $S_3$, of the incident light.

The processor 112 may be configured to determine the polarization data conveying the state of polarization of the received light 102 from a second difference parameter computed between the first subset of pixel responses $I_-^*(\theta)$ and the second subset of pixel responses $I_+^*(\theta)$ of the second set of pixel responses and from the AOI data determined from the first difference parameter. The second difference parameter may be based on $I_{diff}^*$ or on both $I_{sum}^*$ and $I_{diff}^*$. The second difference parameter represents a difference in angular viewpoints between the first subset of pixel responses $I_+^*$ of the second odd pixels $152_O$ and the second subset of pixel responses $I_-^*$ of the second even pixels $152_E$. Referring to FIG. 5, there are depicted three curves of the second differential pixel response $I_{diff}^*$ plotted as functions of the angle of incidence $\theta$, for a given intensity of incident light. In FIG. 5, the second differential pixel response $I_{diff}^*$ represents the second difference parameter computed $I_-^*(\theta)$ and $I_+^*(\theta)$. The second differential pixel response $I_{diff}^*$ may be associated with a pair of one second odd pixel $152_O$ and one second even pixel $152_E$ from the second set 150 of pixels 152 in FIGS. 1 and 2. The three curves in FIG. 5 correspond to three different states of polarization, $S_1$, $S_2$, and $S_3$, of the light 102 received by the TDM 106. For example, the three different states of polarization may correspond to three different linear polarization states, each having a different polarization angle with respect to the grating axes 126, 136. In practice, a library of calibration curves of $I_{diff}^*(\theta)$ for a sufficient number of different possible states of polarization may be provided. It is appreciated that the number of calibration curves contained in the library in given application may be chosen so as to enable accurate interpolation between neighboring curves when attempting to match measurement data.

It is appreciated that the first differential pixel response $I_{diff}$ that would be obtained for the same three states of polarization would be substantially the same because the first diffraction grating 114 is insensitive or at least weakly sensitive to the state of polarization of the received light 102. As a result, the AOI information conveying the angle of incidence of the received light 102 that is encoded in the first diffracted light 120 produced by the first diffraction grating 114 may be reliably extracted from $I_{diff}$.

However, in the case of the second diffracted light 124 produced by the second diffraction grating 116, it is generally not possible to determine with certainty whether variations in $I_{diff}^*$ are due to AOI changes only, SOP changes only, or both AOI changes and SOP changes. This means that, in general, the set of second differential pixel responses $I_{diff}^*$ may not be used alone to unambiguously recover both AOI information and SOP information about the received light 102. This is illustrated by the horizontal dotted line in FIG. 5, which corresponds to a particular value of $I_{diff}^*$ that could be obtained from measurements. This particular value of $I_{diff}^*$ is a priori compatible with any of the three polarization states $S_{P1}$, $S_{P2}$, and $S_{P3}$, each of which corresponding to a different angle of incidence, $\theta_1$, $\theta_2$, and $\theta_3$, respectively. To resolve the ambiguity and determine which one of $S_{P1}$, $S_{P2}$, and $S_{P3}$ corresponds to the actual state of polarization of the received light 102, one can use the AOI information extracted from the first set of pixel responses. In this example, the AOI information extracted from the first set of pixel responses yields $\theta=\theta_2$. Based on this information, one can determine that the state of polarization of the received light 102 is $S_{P2}$. In some embodiments, the state of polarization may be expressed in terms of a proportion or ratio of transverse electric (TE) and transverse magnetic (TM) components in the received light 102.

It is appreciated that in order to use the AOI information extracted from the first differential pixel response $I_{diff}$ associated with a pair of first odd and first even pixels $148_O$, $148_E$ to extract the SOP information encoded in the second differential pixel response $I_{diff}^*$ associated with a pair of second pixels $152_O$, $152_E$, it is assumed that the pair of first pixels $148_O$, $148_E$ and the pair of second pixels $152_O$, $152_E$ are sufficiently close on the pixel array 110. This proximity ensures that the AOI information extracted from $I_{diff}$ can reliably be used to represent the AOI information encoded in $I_{diff}^*$ and, thus, to determine SOP from $I_{diff}^*$. One example of a corresponding set of one pair of first pixels $148_O$, $148_E$ and one pair of second pixels $152_O$, $152_E$ is identified by single-line hatching in FIG. 2. This means that the AOI information conveyed by the portion of the received light 102 that is diffracted by the second diffraction grating 116 and detected by the pair of second pixels $152_O$, $152_E$ can be assumed to be substantially the same as the AOI information conveyed by the portion of the received light 102 that is diffracted by the first diffraction grating 114 and detected by the pair of first pixels $148_O$, $148_E$. Under this assumption, any difference between the first differential pixel response $I_{diff}$ associated with a pair of first pixels $148_O$, $148_E$ and the second differential pixel response $I_{diff}^*$ associated with a corresponding pair of second pixels $152_O$, $152_E$ can be attributed to the polarization sensitivity of the second diffraction grating 116 and can be used to extract information conveying the SOP of the received light 102.

It is appreciated that the pair of first odd and even pixels $148_O$, $148_E$ identified by double-line hatching would be associated with a pair of second odd and even pixels (not shown) disposed in front them, and likewise the pair of second odd and even pixels $152_O$, $152_E$ identified by double-line hatching would be associated with a pair of first odd and even pixels (not shown) disposed behind them.

Several grating parameters can be varied or controlled to enhance or adjust the polarization dependence of the second diffracted light 124 (e.g., Lohmann or Talbot self-images) generated by the second diffraction grating 116 and detected in the near-field by second set 150 of pixels 152. In some embodiments, increasing the polarization sensitivity of the second diffraction grating 116 can involve maximizing or enhancing the difference between the responses of the second diffraction grating 116 to two orthogonal states of polarization, for example, a TE polarization state and a TM polarization state. Non-limiting examples of such grating parameters are presented below.

In some embodiments, the first diffraction grating 114 and the second diffraction grating 116 are made of materials having different electrical permittivities, $\varepsilon_1$ and $\varepsilon_2$, both of which can be complex and frequency dependent. In such a case, the first diffraction grating 114 has a first permittivity $\varepsilon_1$ that determines at least in part a first sensitivity (or insensitivity) of the first diffraction grating 114 to the state of polarization of the received light 102, and the second diffraction grating 116 has a second permittivity $\varepsilon_2$, different from the first permittivity $\varepsilon_1$, that determines at least in part a second sensitivity of the second diffraction grating 116 to the state of polarization of the received light 102. In some embodiments, the second permittivity $\varepsilon_2$ has a magnitude that is larger than a magnitude of the first permittivity $\varepsilon_1$. For example, a ratio of the magnitude of the second permittivity $\varepsilon_2$ to the magnitude of the first permittivity $\varepsilon_1$ ranges from slightly greater than one to about 25.

Without wishing to be bound by theory, the polarization sensitivity of a diffraction grating can be increased by increasing its permittivity, for example, to harness the contrast between electromagnetic boundary conditions at the ridge/groove interface for TE and TM polarizations. Due to these different boundary conditions, the TE and TM modes may propagate inside the second diffraction grating 116 with different propagation constants, thus imparting the second diffraction grating 116 with a polarization-dependent angular response. In some embodiments, such a permittivity contrast can be achieved when the first diffraction grating 114 is made of a dielectric material and the second diffraction grating 116 is made of an electrically conducting material. Non-limiting examples of possible dielectric materials for the first diffraction grating 114 include, to name a few, silicon oxides ($SiO_x$), polymers, colloidal particles, SU-8 photoresist, glasses, and the like. For example, at a wavelength of 532 nm, poly(methyl methacrylate) (PMMA) has a real relative permittivity equal to 2.231 and fused silica has a real relative permittivity equal to 2.133. Non-limiting examples of possible electrically conducting materials for the second diffraction grating 116 include, to name a few, metals, metalloids, metal compounds, such as metal oxides, semiconductors, alloys, and the like. For example, at a wavelength of 532 nm, silver has a real relative permittivity equal to −11.75, aluminum has a real relative permittivity equal to −40.329, and titanium oxide has a real relative permittivity equal to 6.76.

Figure 6:
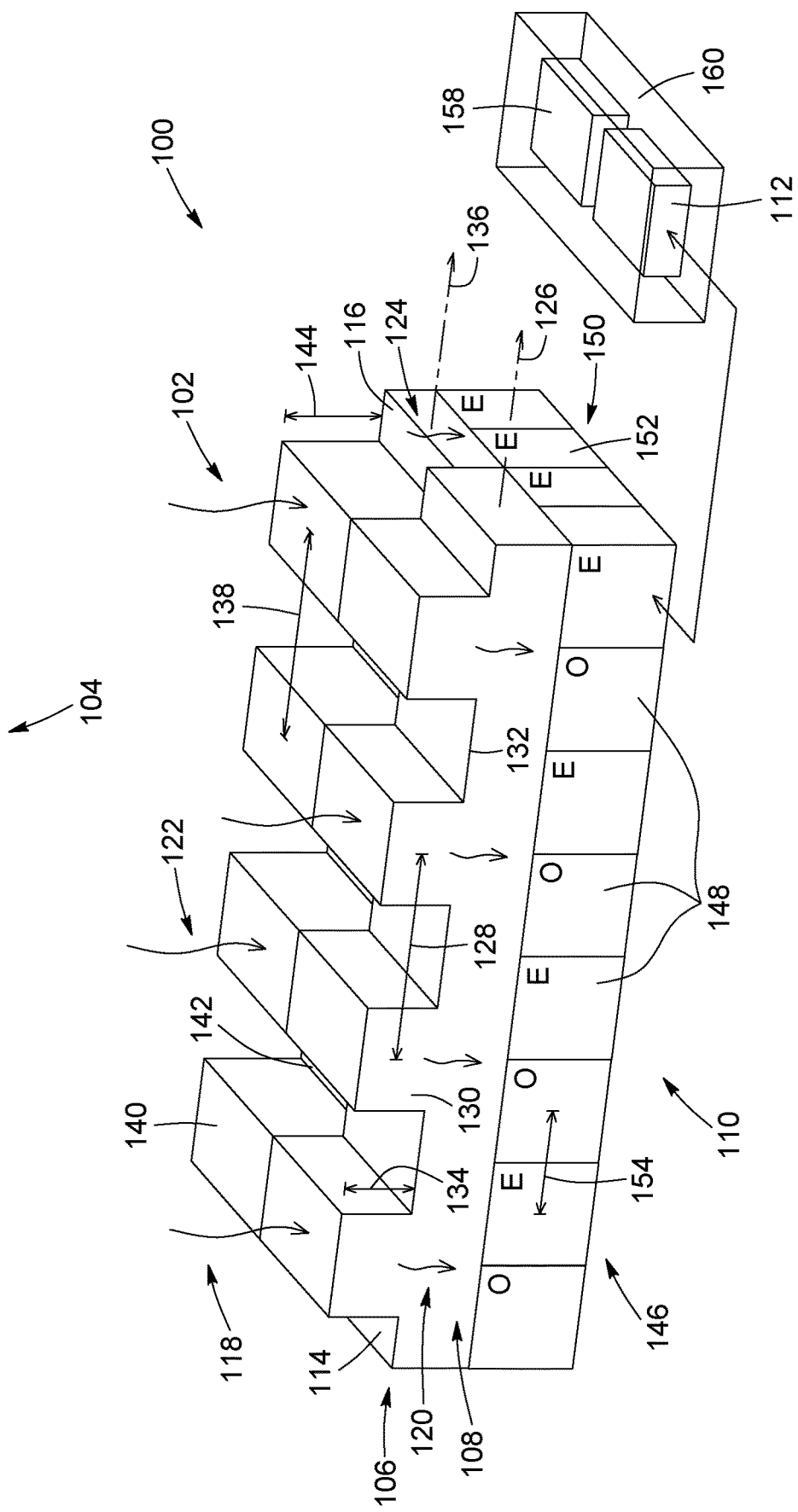
FIG. 6 is a schematic perspective view of an imaging system, in accordance with another embodiment, where the first and second diffraction gratings have different step-height-to-grating-period ratios.

Referring to FIG. 6, in some embodiments, the polarization sensitivity of the second diffraction grating 116 can be enhanced by increasing or otherwise adjusting the ratio of its step height 144 to its grating period 138. Without wishing to be bound by theory, the polarization sensitivity of a diffraction grating can be increased by adjusting the ratio of its step height to its grating period because it can allow enhancement of the phase difference accumulation between the TE and TM modes as they propagate inside the second diffraction grating 116.

Figure 7:
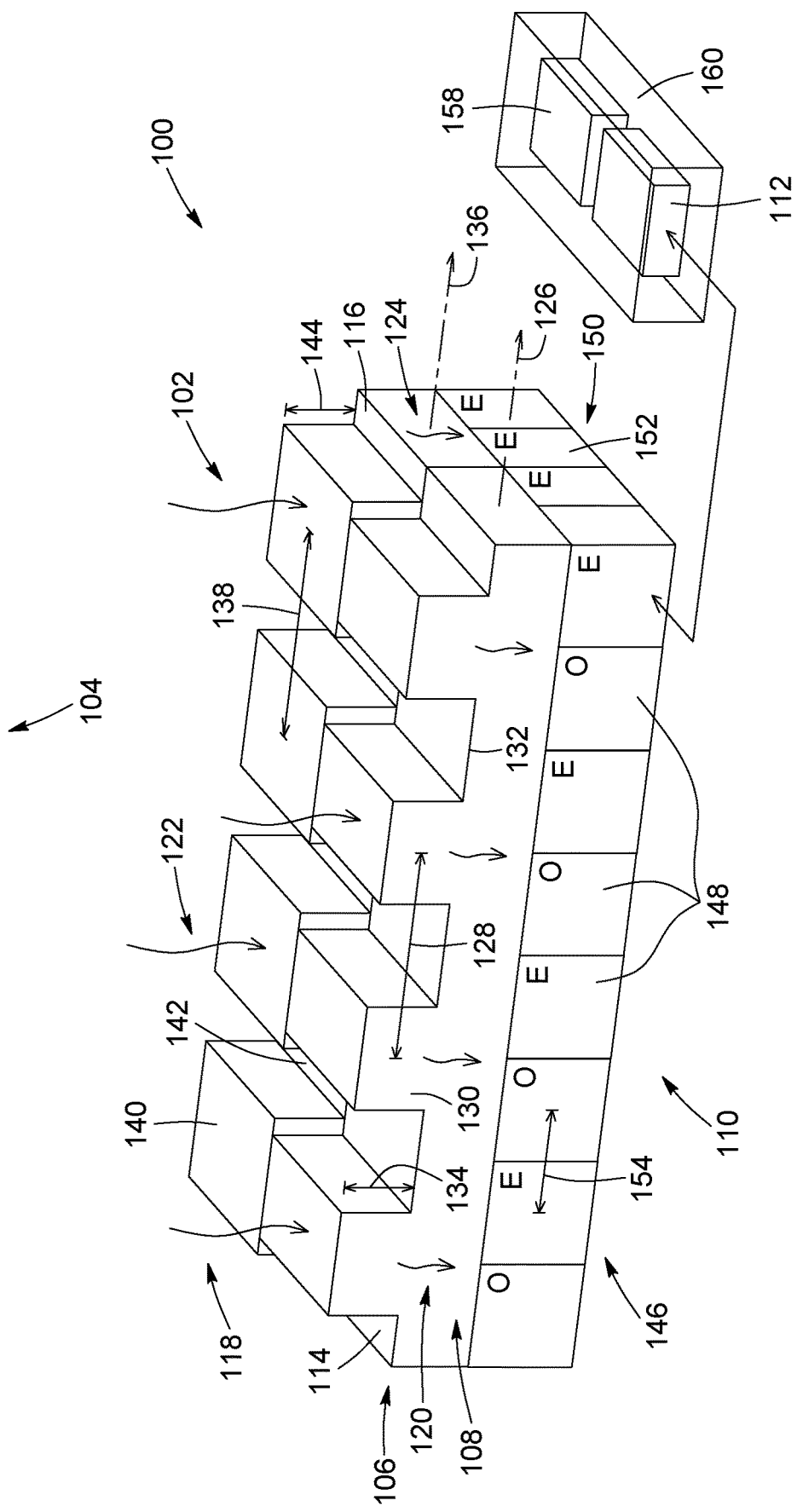
FIG. 7 is a schematic perspective view of an imaging system, in accordance with another embodiment, where the first and second diffraction gratings have different duty cycles.

Referring to FIG. 7, in some embodiments, the polarization sensitivity of the second diffraction grating 116 can be enhanced by increasing or otherwise adjusting its duty cycle. For example, the propagation constant difference of TE and TM modes, and thus the phase difference accumulation between them, can be varied by adjusting the duty cycle of the second diffraction grating 116 when the second diffraction grating 116 is a sufficiently thick dielectric grating.

In some embodiments, multiple grating parameters of the second diffraction grating 116 may be adjusted or controlled to provide enhanced polarization sensitivity. For example, the second diffraction grating 116 may include any, some, or all of an increased permittivity, an adjusted (e.g., increased) step-height-to-grating-period ratio (such as in FIG. 6), and an adjusted (e.g., increased) duty cycle (such as in FIG. 7).

Figure 8:
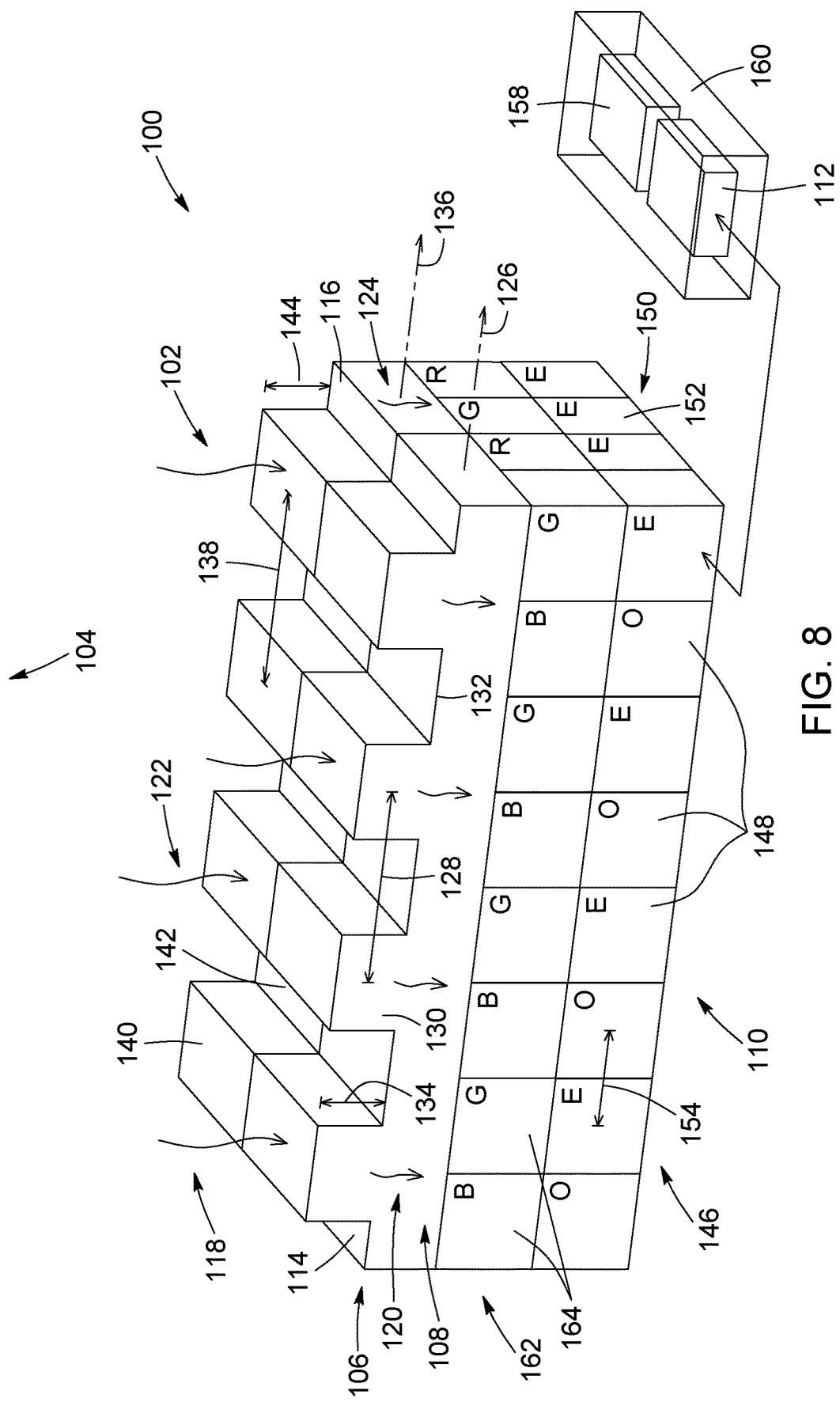
FIG. 8 is a schematic perspective view of an imaging system, in accordance with another embodiment, which includes a color filter array interposed between the transmissive diffraction mask and the pixel array.

Referring to FIG. 8, there is illustrated another embodiment of an imaging system 100 which can be used for dual depth and polarization sensing. The embodiment of FIG. 8 shares several features with the embodiment of FIGS. 1 and 2, which will not be described again other than to highlight differences between them. In contrast to the embodiment of FIGS. 1 and 2, which is intended for monochrome applications, the embodiment of FIG. 8 is intended for color applications. In FIG. 8, the imaging system 100 includes a color filter array 162 interposed between the TDM 106 and the pixel array 110. The color filter array 162 includes a plurality of color filters 164 arranged in a mosaic color pattern. The color filter array 162 is configured to filter the diffracted wavefront 108 spatially and spectrally according to the mosaic color pattern prior to detection of the diffracted wavefront 108 by the pixel array 110. In the illustrated embodiment, the color filter array 162 is spatially registered with the pixel array 110 such that each color filter 164 is coupled in a one-to-one relationship to a corresponding one of the pixels 148, 152. In the illustrated embodiment, the color filters 164 include red filters (R), green filters (G), and blue filters (B), although other filters may alternatively or additionally be used in other embodiments, such as yellow filters (Y), cyan filters (C), magenta filters (M), and clear or white filters (W). In the illustrated embodiment, the mosaic color pattern of the color filter array 162 is an RGGB Bayer pattern. In other embodiments, the mosaic color pattern may be embodied by more elaborate Bayer-type patterns, for example, Bayer-type patterns with an n-pixel unit cell, where n is an integer greater than 4. Of course, the present techniques are not limited to Bayer-type patterns, but may be applied to any appropriate mosaic color pattern including, but not limited to, RGB-IR, RGB-W, CYGM, and CYYM. In color implementations, the determination of AOI data from the first set of pixel responses and the determination of SOP data from the second set of pixel responses and the AOI data can be performed on a per-color basis by parsing the pixel data according to color components, for example, based on parsing techniques such as or similar to those described in co-assigned international patent applications PCT/CA2017/050686 (published as WO 2017/210781), PCT/CA2018/051554 (published as WO 2019/109182), and PCT/CA2020/050760 (published as WO 2020/243828).

Depending on the application, the imaging systems disclosed herein may include various additional components interposed between the TDM and the pixel array. Non-limiting examples of such additional components include, to name a few, microlenses, color filters, color filter isolation structures, light guides, pixel circuitry, and the like. The structure, configuration, and operation of such components are generally known in the art and need not be described in greater detail herein.

Although the embodiments described above with respect to FIGS. 1 to 8 include two types of diffraction gratings to provide dual depth and polarization sensing, other embodiments may include more than two types of diffraction gratings. For example, in some embodiments, the TDM may include n types of diffraction gratings, n being integer greater than two, where one of the diffraction types is polarization-insensitive and the n−1 other diffraction types are polarization-sensitive, each with a different sensitivity. The provision of different types of diffraction gratings with different polarization sensitivities can increase the accuracy of SOP determination. In such a case, the determination of the polarization data conveying the SOP of the received light can involve solving a system of coupled non-linear equations.

Figure 9:
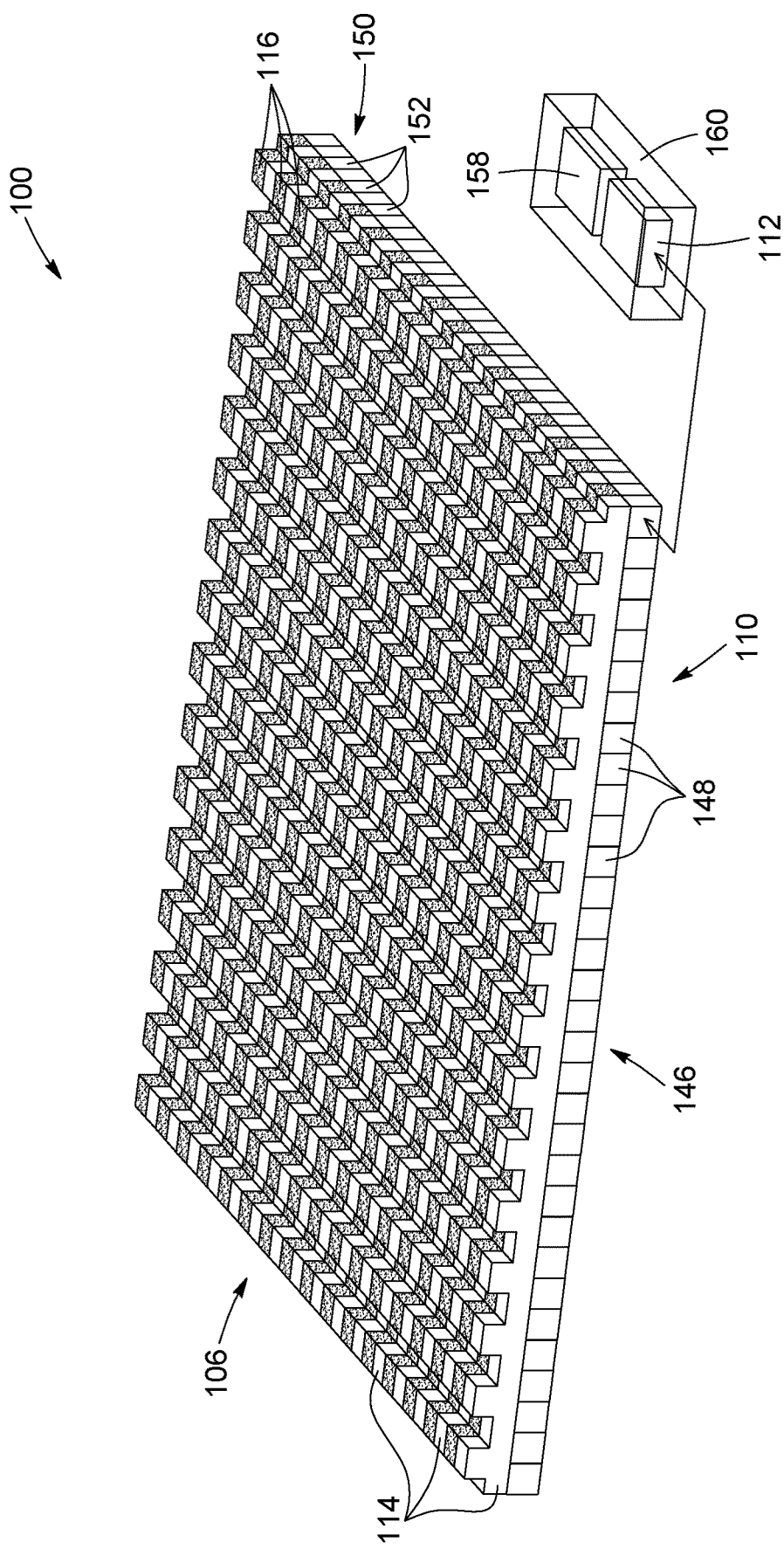
FIG. 9 is a schematic perspective view of an imaging system, in accordance with another embodiment, where the transmissive diffraction mask includes a plurality of first diffraction gratings and a plurality of second diffraction gratings interleaved with each other in an alternating pattern along a single grating orientation.

For simplicity and ease of illustration, the embodiments described above with respect to FIGS. 1 to 8 include one instance of the first diffraction grating and one instance of the second diffraction grating. Referring to FIG. 9, in practice, the TDM 106 will generally include a large number of first diffraction gratings 114 and a large number of second diffraction gratings 116, where the second diffraction gratings 116 have been highlighted in light gray for clarity. In some embodiments, the number of first and second diffraction gratings can exceed hundreds of thousands or even millions.

Figure 10:
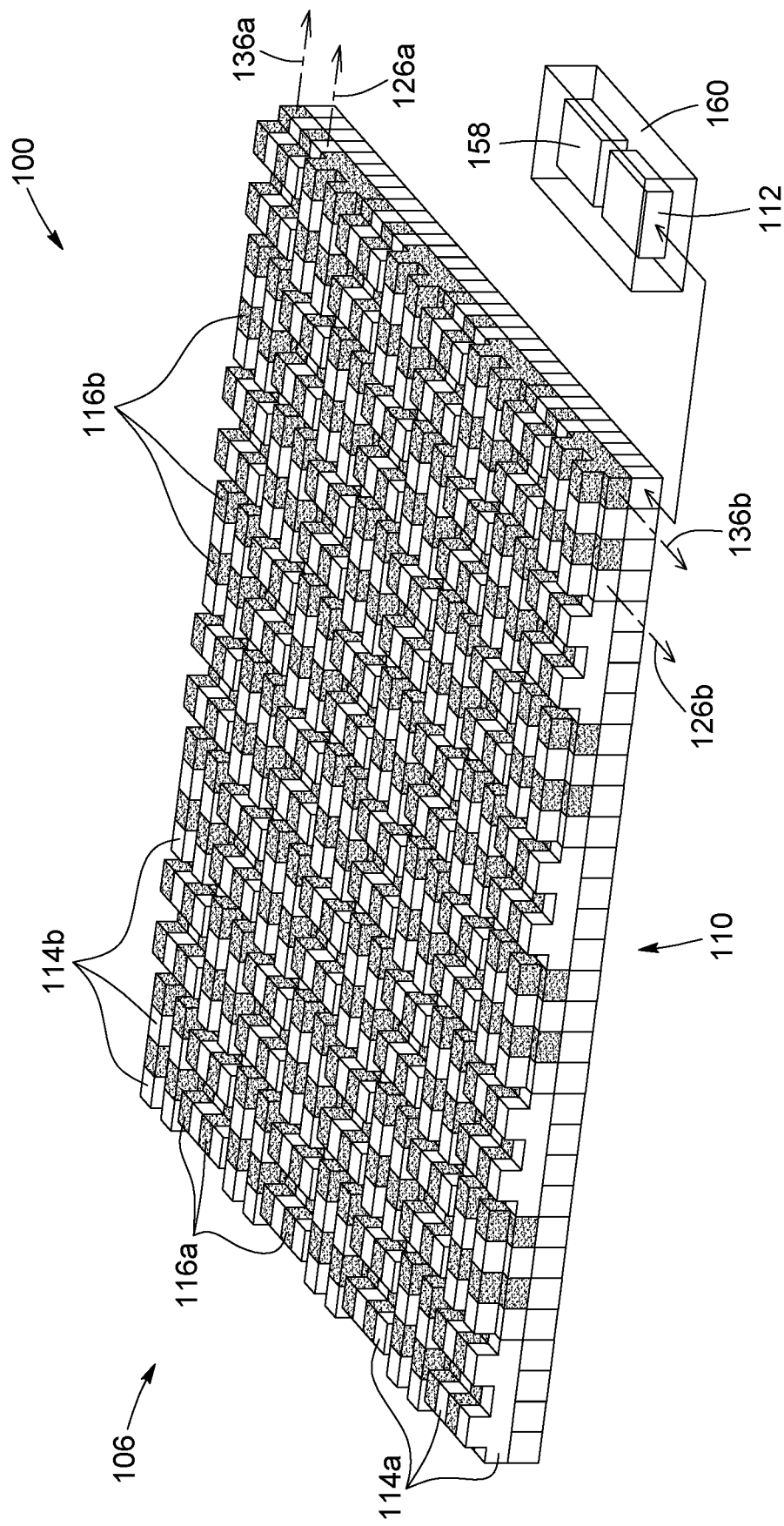
FIG. 10 is a schematic perspective view of an imaging system, in accordance with another embodiment, where the transmissive diffraction mask includes a plurality of first diffraction gratings and a plurality of second diffraction gratings interleaved with each other in rows and columns to define a checkerboard pattern along two orthogonal grating orientations.

The embodiments described above with respect to FIGS. 1 to 9 include a single grating orientation. However, this is not a requirement. Referring to FIG. 10, there is illustrated another embodiment of an imaging system 100 that includes a TDM 106 having a first set of pairs of first and second diffraction gratings 114a, 116a and a second set of pairs of first and second diffraction gratings 114b, 116b, where the grating axes 126a, 136a of the first and second diffraction gratings 114a, 116a of the first set extend perpendicularly to the grating axes 126b, 136b of the first and second diffraction gratings 114b, 116b of the second set. The second diffraction gratings 116a, 116b of each set have been highlighted in light gray for clarity. In the illustrated embodiment, the pairs of first and second diffraction gratings 114a, 116a of the first set and the pairs of first and second diffraction gratings 114b, 116b of the second set are interleaved in rows and columns to define a checkerboard pattern.

It is appreciated that any other suitable regular or irregular arrangements of orthogonally or non-orthogonally oriented sets of pairs of first and second gratings may be used in other embodiments. For example, in some variants, the orthogonally oriented sets of pairs of gratings may be arranged to alternate only in rows or only in columns, or be arranged randomly. Other variants may include more than two sets of pairs of first and second diffraction gratings. It is appreciated that providing the TDM 106 with sets of pairs of diffraction gratings having different grating axis orientations may be advantageous or required in some applications, since diffraction generally occurs along the grating axis of an individual diffraction grating. This means that when the TDM 106 includes a single grating orientation, light coming from objects that extend perpendicularly to the single grating orientation will generally not produce a diffracted wavefront from which AOI information may be extracted. In some embodiments, providing the TDM 106 with two orthogonally oriented sets of gratings (e.g., horizontally and vertically oriented gratings, such as in FIG. 10) may suffice to capture enough light field image data about the scene. In some embodiments, the TDM 106 may include more than two grating orientations.

It is appreciated that although the embodiments described above with respect to FIGS. 1 to 10 depict the first and second diffraction gratings as one-dimensional, binary phase gratings consisting of alternating sets of parallel ridges and grooves forming a square-wave grating profile, other embodiments may use other types of first and second diffraction gratings. For example, other embodiments may use first and second diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted wavefront may be tailored by proper selection of the grating parameters. Furthermore, in embodiments where the TDM includes multiple sets of pairs of first and second diffraction gratings, such as in FIG. 10, the first and second diffraction gratings in different sets need not be identical. In general, the TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, and the like.

Figure 11:
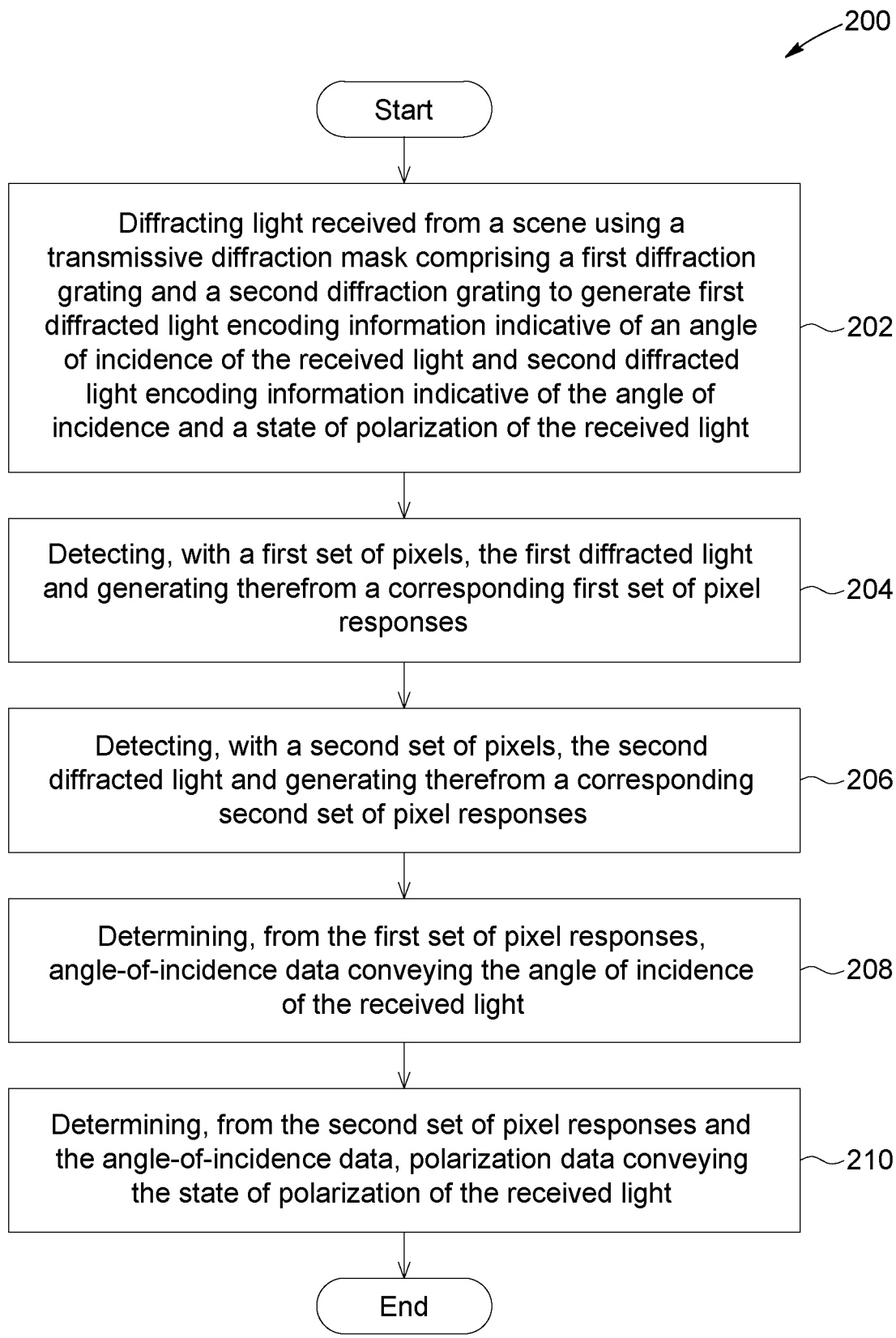
FIG. 11 is a flow diagram of a method of imaging a scene, in accordance with an embodiment.

Referring to FIG. 11, in accordance with another aspect, there is provided a flow diagram of an embodiment of a method 200 of imaging a scene for dual depth and polarization sensing. The method 200 may be implemented with an imaging system such as the ones described above with references to FIGS. 1 to 10, or another imaging system. The method 200 includes a step 202 of diffracting light received from a scene using a TDM. The TDM includes a first diffraction grating and a second diffraction grating, both of which can be binary phase gratings. For example, the first diffraction grating may include a series of alternating ridges and grooves extending along a first grating axis at a first grating period, and the second diffraction grating may include a series of alternating ridges and grooves extending along a second grating axis at a second grating period. The first and second grating periods may be equal to each other.

The first diffraction grating is configured to diffract a first portion of the received light to generate first diffracted light, and the second diffraction grating is configured to diffract a second portion of the received light to generate second diffracted light. The first diffracted light and the second diffracted light each have, in a near-field diffraction region regime, an intensity profile that is spatially modulated according to the grating period and that shifts laterally along the grating axis in response to variations in the angle of incidence of the light received from the scene. Thus, the first diffracted light and the second diffracted light each encode information indicative of the angle of incidence of the received light. The second diffraction grating also has a sensitivity to the state of polarization of the incident light, such that the second diffracted light also encodes information indicative of the state of polarization of the received light.

In some embodiments, the method 200 can include a step of providing the first diffraction grating with a first permittivity that determines at least in part a first sensitivity of the first diffraction grating to the state of polarization of the received light, and a step of providing the second diffraction grating with a second permittivity that determines at least in part a second sensitivity of the second diffraction grating to the state of polarization of the received light, wherein the second permittivity differs from the first permittivity. For example, the magnitude of the second permittivity may be larger than the magnitude of the first permittivity. In some embodiments, the first diffraction grating may be made of a dielectric material, and the second diffraction grating may be made of metal or another electrically conducting material. In some embodiments, the diffraction grating may be substantially insensitive to the state of polarization of the received light.

In some embodiments, the difference between the first polarization sensitivity and the second polarization sensitivity may be caused by the first and second diffraction gratings having different step-height-to-grating-period ratios and/or different duty cycles. For example, the second diffraction grating may have a larger step-height-to-grating-period ratio and/or a larger duty cycle than the first diffraction grating.

The method 200 also includes a step 204 of detecting, with a first set of pixels, the first diffracted light and generating therefrom a corresponding first set of pixel responses, and a step 206 of detecting, with a second set of pixels, the second diffracted light and generating therefrom a corresponding second set of pixel responses. The first set of pixels may have a first pixel pitch along the first grating axis, and the first pixel pitch may be half of the first grating period. Similarly, the second set of pixels may have a second pixel pitch along the second grating axis, and the second pixel pitch may be half of the second grating period.

In some embodiments, the step 204 of generating the first set of pixel responses includes generating a first subset of pixel responses corresponding to a first subset of pixels of the first set of pixels, and generating a second subset of pixel responses corresponding to a second subset of pixels of the first set of pixels, wherein the first subset of pixel responses and the second subset of pixel responses vary differently from each other as a function of the angle of incidence of the received light. In some embodiments, the first subset and the second subset of pixel responses of the first set of pixel responses have magnitudes that respectively increase and decrease as the angle of incidence of the received light increases. In some embodiments, the step 206 of generating the second set of pixel responses includes generating a first subset of pixel responses corresponding to a first subset of pixels of the second set of pixels, and generating a second subset of pixel responses corresponding to a second subset of pixels of the second set of pixels, wherein the first subset of pixel responses and the second subset of pixel responses vary differently from each other as a function of the angle of incidence of the received light. In some embodiments, the first subset and the second subset of pixel responses of the second set of pixel responses have magnitudes that respectively increase and decrease as the angle of incidence of the received light increases.

The method 200 further includes a step 208 of determining, from the first set of pixel responses, angle-of-incidence data conveying the angle of incidence of the received light, and a step 210 of determining, from the second set of pixel responses and the angle-of-incidence data, polarization data conveying the state of polarization of the received light. In some embodiments, the method 200 may include a step of generating a depth image of the scene based on the angle-of-incidence data. In embodiments, the step 210 of determining the polarization data conveying the state of polarization of the received light may includes determining the state of polarization of the received light as a linear polarization state, and determining a polarization angle of the linear polarization state with respect to a plane of incidence of the received light on the TDM.

In some embodiments, the step 208 of determining the angle-of-incidence data conveying the angle of incidence of the received light includes computing a first difference parameter between the first subset of pixel responses and the second subset of pixel responses of the first set of pixel responses, and obtaining the angle-of-incidence data from the first difference parameter. In some embodiments, the step 201 of determining the polarization data conveying the state of polarization of the received light includes computing a second difference parameter between the first subset of pixel responses and the second subset of pixel responses of the second set of pixel responses, and obtaining the polarization data from the second different parameter and from the angle-of-incidence data determined from the first difference parameter.

In accordance with another aspect of the present description, there is provided a non-transitory computer readable storage medium having stored thereon computer readable instructions that, when executed by a processor, cause the processor to perform various steps of a method of imaging of a scene such as described herein. For example, the imaging method may include a step of receiving a first set of pixel responses and a second set of pixel responses. The first set of pixel responses corresponds to a first portion of light received from the scene and having been diffracted, prior to detection, into first diffracted light encoding information indicative of an angle of incidence of the received light. The second set of pixel responses corresponds to a second portion of the light received from the scene and having been diffracted, prior to detection, into second diffracted light encoding information indicative of the angle of incidence of the received light and a state of polarization of the received light. The imaging method may also include a step of determining, from the first set of pixel responses, angle-of-incidence data conveying the angle of incidence of the received light, and a step of determining, from the second set of pixel responses and the angle-of-incidence data, polarization data conveying the state of polarization of the received light. In some embodiments, the imaging method may include generating a depth image of the scene based on the angle-of-incidence data.

In accordance with another aspect of the present description, there is provided a computer device including a processor and a non-transitory computer readable storage medium such as described herein and being operatively coupled to the processor. FIGS. 1, 2 and 6 to 10 each depict an example of a computer device 160 that includes a processor 112 and a non-transitory computer readable storage medium 158 (also referred to above as a memory) operably connected to the processor 112.

Examples & Applications

The following description presents various additional aspects of the present techniques. It is appreciated that the techniques described herein may have a number of optional features, variations, and applications. In particular, the following description is provided to further illustrate some aspects of the disclosed techniques, but should not be construed as in any way limiting their scope.

Applications of TDM-Based Polarization-Sensitive Pixels

TDM-based polarization-sensitive pixels such as described herein can provide information indicative of a linear state of polarization of received light in the field of view. This can be used for numerous applications, two of which are discussed below.

Figure 12:
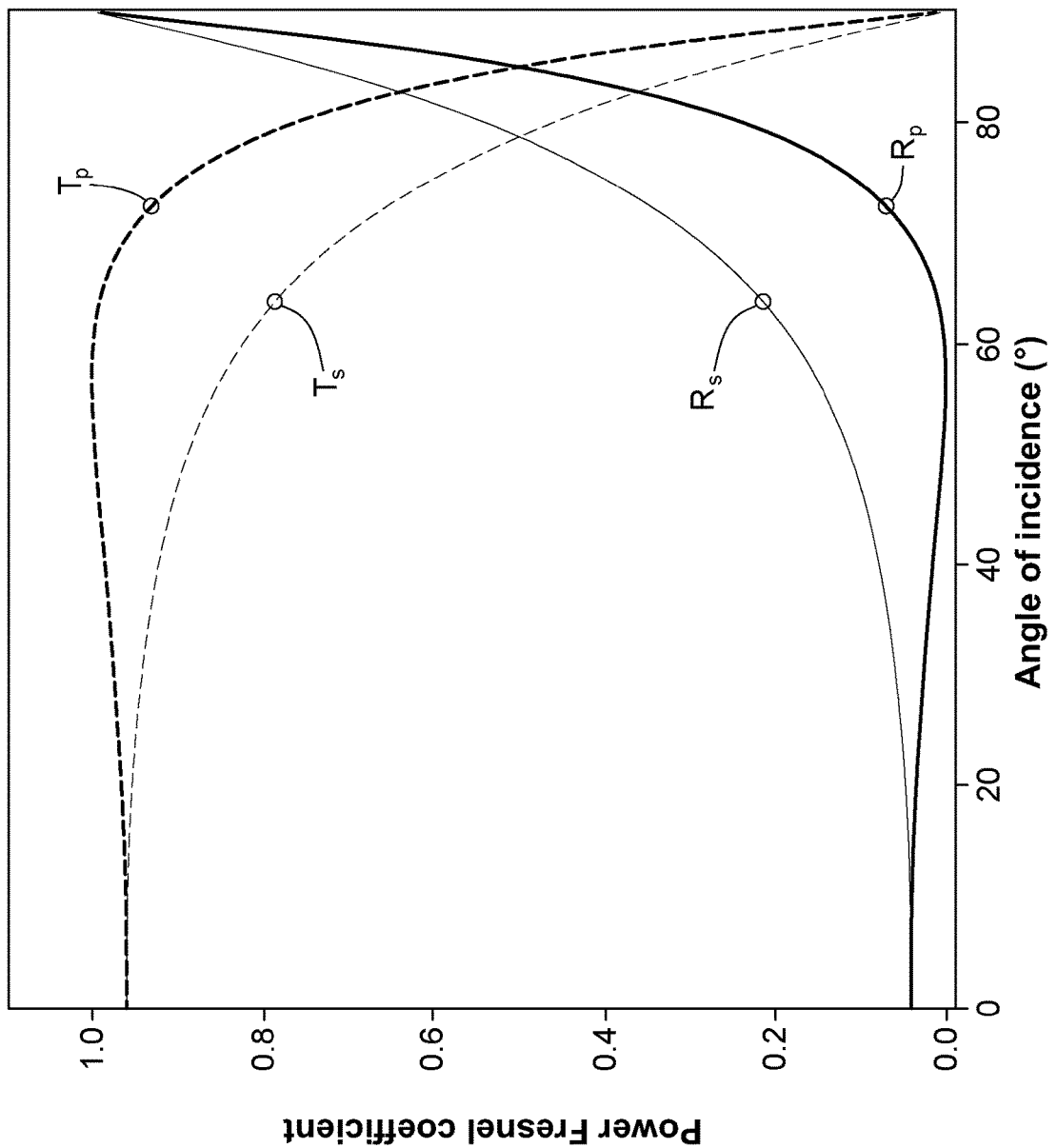
FIG. 12 is a graph depicting curves of the power Fresnel coefficients $R_s$, $R_p$, $T_s$, and $T_p$, plotted as functions of the angle of incidence for an air-dielectric interface ($n_{air}$=1.0 and $n_{dielectric}$=1.5), where the subscripts s and p refer to s and p polarizations, respectively.

Detection of transparent dielectric surfaces. When light strikes a transparent dielectric surface, it is partially reflected and partially transmitted. The power reflectance and transmittance generally depend on the angle of incidence and the state of polarization (e.g., s or p) of the light incident on the dielectric surface. Knowing the refractive indices on both sides of the interface, one can determine the reflected and transmitted powers using the associated Fresnel coefficients $R_s$, $R_p$, $T_s$, and $T_p$ for s and p polarizations. The power Fresnel coefficients $R_s$, $R_p$, $T_s$, and $T_p$ are plotted in FIG. 12 as functions of the angle of incidence for an air-dielectric interface ($n_{air}$=1.0; $n_{dielectric}$=1.5). FIG. 12 shows that at normal incidence ($\theta$=0°) and grazing incidence ($\theta$=90°), the polarization state of the incident light is conserved in the reflected and transmitted beam. However, at an incidence angle of about 55°, corresponding to Brewster's angle, the contrast in power coefficients between the two polarization states is maximum. The polarization contrast ratios $P_R$ and $P_T$ in reflection and transmission of a beam of unpolarized light incident on the dielectric interface can be written as follows:

$$P_R = \frac{|R_s - R_p|}{R_s + R_p}, \quad (8)$$

$$P_T = \frac{|T_s - T_p|}{T_s + T_p}. \quad (9)$$

Figure 13:
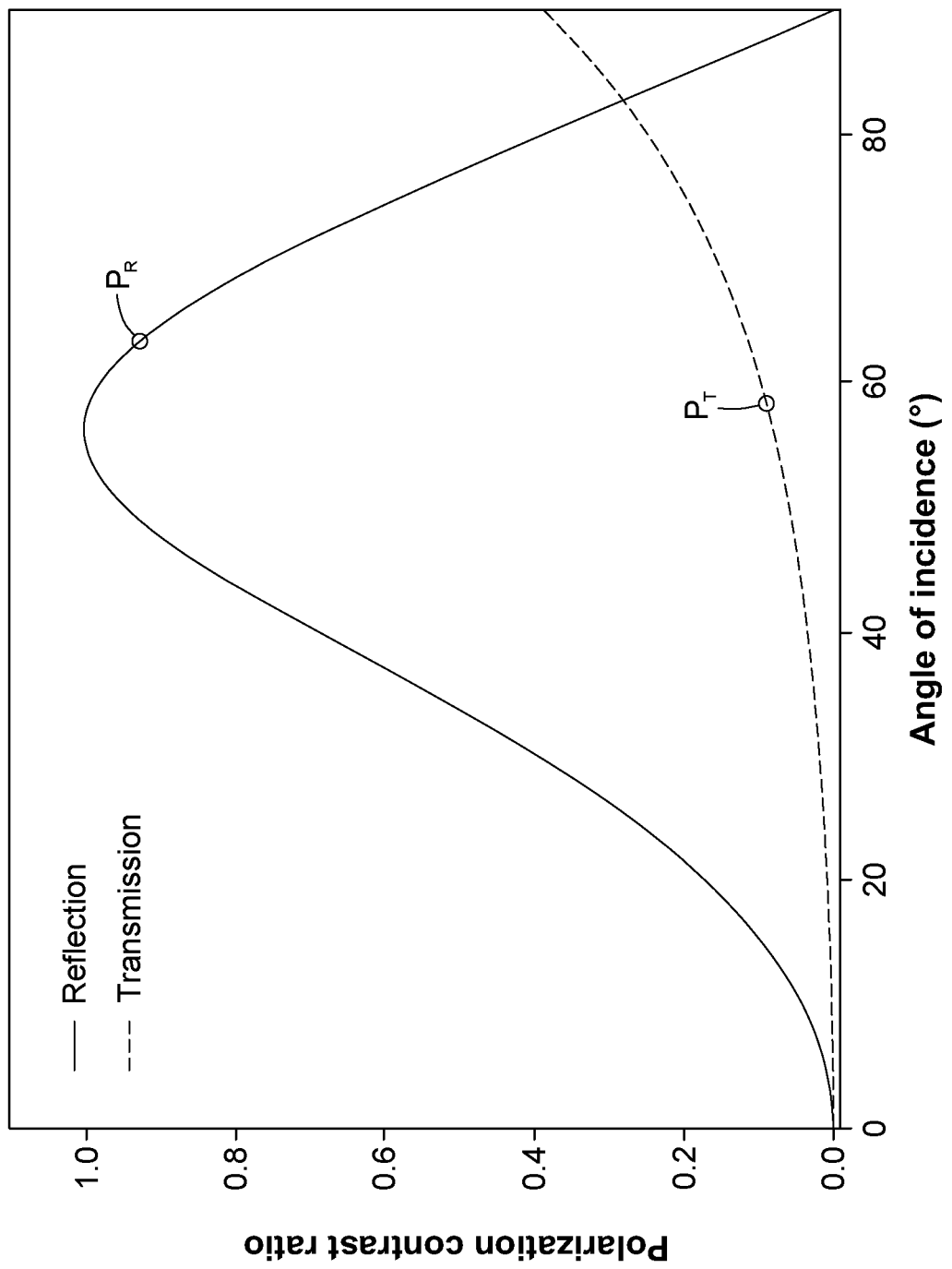
FIG. 13 is a graph depicting curves of the polarization contrast ratios in reflection ($P_R$) and transmission ($P_T$) of a beam of unpolarized light incident on the dielectric interface, plotted as a function of the angle of incidence.

The polarization contrast ratios $P_R$ and $P_T$ are plotted in FIG. 13 as functions of the angle of incidence.

It is seen from FIG. 13 that obliquely incident light on a smooth dielectric surface appreciably changes the polarization state of light. Using an imaging system that includes an array of angle- and polarization-sensitive pixels, such as disclosed herein, one can produce both depth and polarization contrast maps, and thus detect regions with large polarization contrast ratios. Such regions may indicate the presence of smooth transparent surfaces, such as in windows, in the field of view. The depth information associated with these regions can be used to infer their positions. Given that scenes are typically illuminated by unpolarized light, the dual depth and polarization sensing provided by the present techniques may be useful in a variety of applications. Non-limiting examples include, to name a few, flight assistance for drones or navigation of other robotic vehicles operating in environments where windows may be present and harmful. This information may also be used along with conventional color images to classify objects in a scene, for example, cars and other vehicles having a large number of reflective surfaces. It is appreciated that conventional depth imaging systems may be unable to or have difficulty in locating transparent surfaces, such as windows, due to their featureless appearance. This limitation may pose a problem in some robotic automation processes such as path planning or navigation. Techniques enabling dual depth and polarization sensing such as disclosed therein may be used to detect transparent surfaces, which can help reducing collision risk and provide more scene information. In some applications, the detection of transparent surfaces with TDM-based polarization-sensitive pixels can be applied to determine surface normal orientations of transparent objects, from which shape information can be retrieved and used in various applications such as shape inspection and flaw detection. Reference is made to M. Saito et al., "Measurement of Surface Orientations of Transparent Objects Using Polarization in Highlight", *Proc. IEEE Conf. Computer Vision and Pattern Recognition*, vol. 1, pp. 381-386, 1999, the contents of which are incorporated herein by reference in their entirety.

Figure 14:
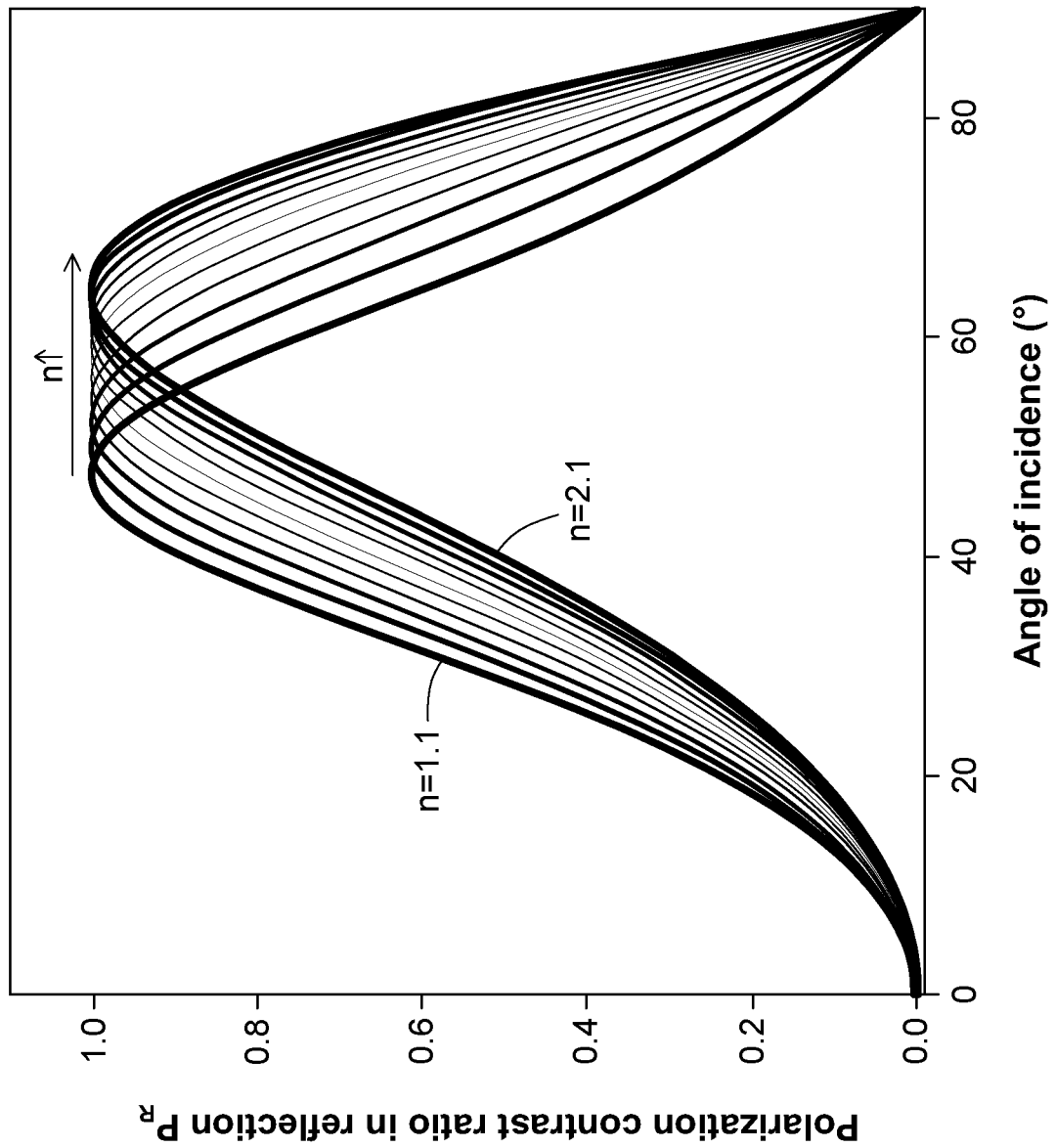
FIG. 14 is a graph depicting eleven curves of the polarization contrast ratio in reflection, plotted as functions of the angle of incidence, where each curve corresponds to a different refractive index n for the material forming the reflective surface, and where n ranges from 1.1 to 2.1 in steps of 0.1.
Figure 15:
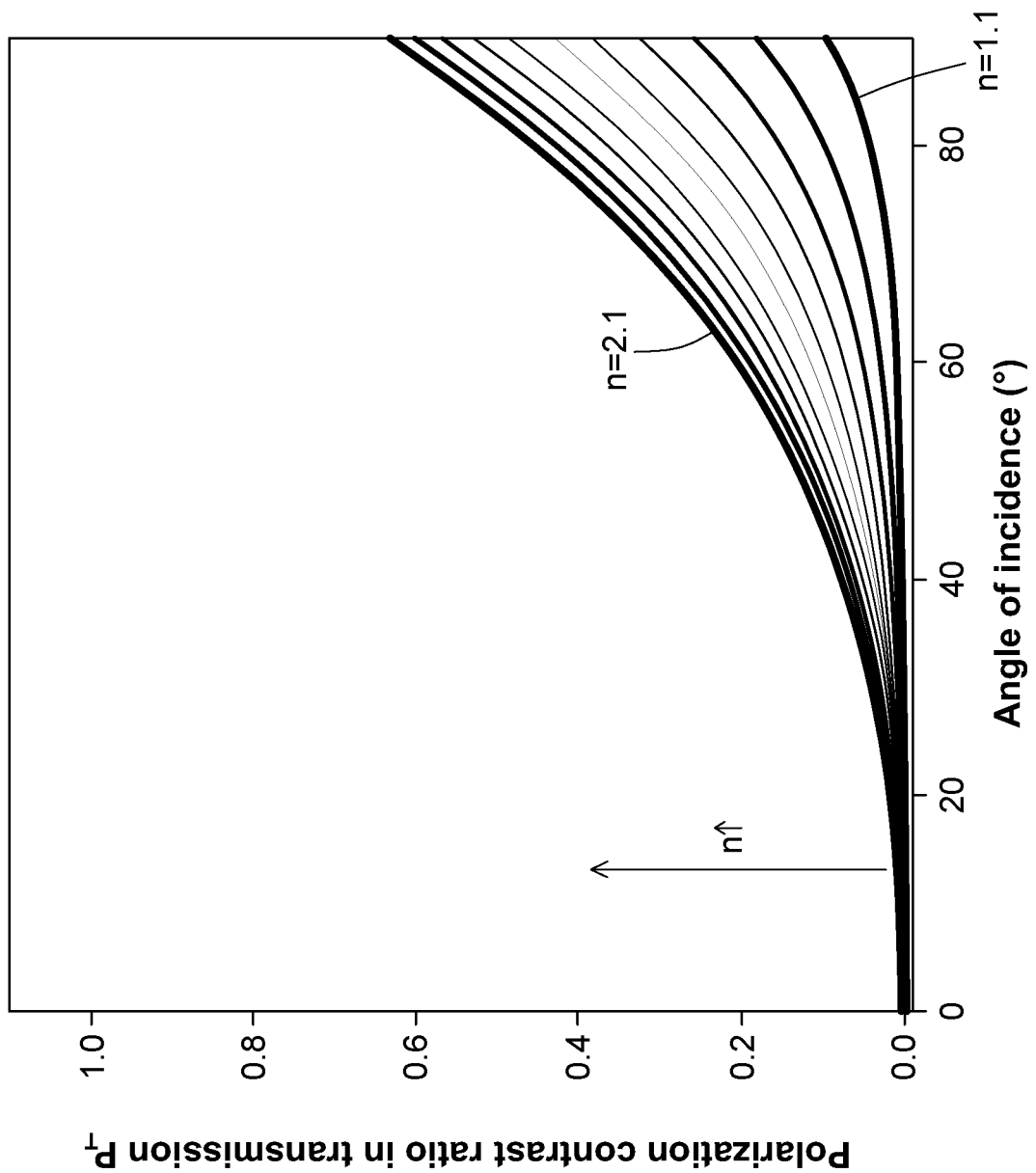
FIG. 15 is a graph depicting eleven curves of the polarization contrast ratio in transmission, plotted as functions of the angle of incidence, where each curve corresponds to a different refractive index n for the material forming the transmissive surface, and where n ranges from 1.1 to 2.1 in steps of 0.1.

Refractive index extraction. Conventional depth imaging systems may be unable or have difficulty to identify types of materials. This limitation may make conventional depth imaging systems vulnerable to biometric spoofing, for example, facial recognition spoofing. In some applications, the present techniques can provide depth and polarization contrast maps that can be used to measure the refractive index of a material having a reflective surface. As depicted in FIG. 14, the angular response of the polarization contrast ratio in reflection, $P_R$, varies as a function of the refractive index of the material forming the reflective surface. By measuring the polarization contrast ratio in reflection at a known angle of incidence, the index of refraction of the material can be determined. The polarization contrast ratio may be obtained from the polarization contrast map, while the orientation of the surface normal of the reflective surface with respect to the optical axis of the imaging system may be obtained from the depth map and the position and orientation of the imaging system with respect to the light source. In some embodiments, refractive index extraction can be used as a supplementary protection mechanism against biometric spoofing by comparing the obtained refractive index against the expected or typical refractive index of human skin. In other embodiments, refractive index extraction can be used in industrial applications, for example, for identifying materials or supporting robot decision-making processes. Referring to FIG. 15, in some embodiments, the refractive index dependence of the angular response of the polarization contrast ratio in transmission, $P_T$, may also or alternatively be used for refractive index extraction in material identification applications.

Numerous modifications could be made to the embodiments described above without departing from the scope of the appended claims.

What is claimed is:

1. An imaging system, comprising:
   a transmissive diffraction mask (TDM) configured to receive light incident from a scene, the TDM comprising:
   a first diffraction grating configured to diffract a first portion of the received light to generate first diffracted light, the first diffracted light encoding information indicative of an angle of incidence of the received light; and
   a second diffraction grating configured to diffract a second portion of the received light to generate second diffracted light, the second diffracted light encoding information indicative of the angle of incidence of the received light and a state of polarization of the received light;
   a pixel array comprising:
   a first set of pixels configured to detect the first diffracted light and generate therefrom a corresponding first set of pixel responses; and
   a second set of pixels configured to detect the second diffracted light and generate therefrom a corresponding second set of pixel responses; and
   a processor configured to:
   receive the first set of pixel responses from the first set of pixels and the second set of pixel responses from the second set of pixels;
   determine, from the first set of pixel responses, angle-of-incidence data conveying the angle of incidence of the received light; and
   determine, from the second set of pixel responses and the angle-of-incidence data determined from the first set of pixel responses, polarization data conveying the state of polarization of the received light.

2. The imaging system of claim 1, wherein the first diffraction grating is substantially insensitive to the state of polarization of the received light.

3. The imaging system of claim 1, wherein:
   the first diffraction grating has a first permittivity that determines at least in part a first sensitivity of the first diffraction grating to the state of polarization of the received light;
   the second diffraction grating has a second permittivity that determines at least in part a second sensitivity of the second diffraction grating to the state of polarization of the received light; and
   the first permittivity and the second permittivity differ from each other.

4. The imaging system of claim 3, wherein the first permittivity has a first magnitude, the second permittivity has a second magnitude, and the second magnitude is larger than the first magnitude.

5. The imaging system of claim 1, wherein the first diffraction grating is made of a dielectric material, and the second diffraction grating is made of an electrically conducting material.

6. The imaging system of claim 1, wherein:
the first diffraction grating comprises a series of alternating ridges and grooves extending along a first grating axis at a first grating period; and
the second diffraction grating comprises a series of alternating ridges and grooves extending along a second grating axis at a second grating period.

7. The imaging system of claim 6, wherein:
the first set of pixels has a first pixel pitch along the first grating axis, the first pixel pitch being half of the first grating period; and
the second set of pixels has a second pixel pitch along the second grating axis, the second pixel pitch being half of the second grating period.

8. The imaging system of claim 6, wherein:
the series of alternating ridges and grooves of the first diffraction grating defines a first duty cycle of the first diffraction grating;
the series of alternating ridges and grooves of the second diffraction grating defines a second duty cycle of the second diffraction grating; and
the second duty cycle is different from the first duty cycle.

9. The imaging system of claim 6, wherein:
the series of alternating ridges and grooves of the first diffraction grating defines a first step height of the first diffraction grating;
the series of alternating ridges and grooves of the second diffraction grating defines a second step height of the second diffraction grating; and
the second step height is different from the first step height.

10. The imaging system of claim 1, wherein:
the first diffraction grating is one of a plurality of first diffraction gratings, the plurality of first diffraction gratings being arranged along either a single grating orientation or two orthogonal grating orientations; and
the second diffraction grating is one of a plurality of second diffraction gratings, the plurality of second diffraction gratings being arranged along either the single grating orientation or the two orthogonal grating orientations.

11. The imaging system of claim 1, wherein:
the first set of pixels comprises a first subset of pixels and a second subset of pixels;
the first set of pixel responses comprises a first subset of pixel responses corresponding to the first subset of pixels and a second subset of pixel responses corresponding to the second subset of pixels, the first subset of pixel responses and the second subset of pixel responses varying differently from each other as a function of the angle of incidence of the received light;
the second set of pixels comprises a first subset of pixels and a second subset of pixels; and
the second set of pixel responses comprises a first subset of pixel responses corresponding to the first subset of pixels and a second subset of pixel responses corresponding to the second subset of pixels, the first subset of pixel responses and the second subset of pixel responses varying differently from each other as a function of the angle of incidence of the received light.

12. The imaging system of claim 11, wherein the processor is configured to:
determine the angle-of-incidence data conveying the angle of incidence of the received light from a first difference parameter computed between the first subset of pixel responses and the second subset of pixel responses of the first set of pixel responses; and
determine the polarization data conveying the state of polarization of the received light from a second difference parameter computed between the first subset of pixel responses and the second subset of pixel responses of the second set of pixel responses and from the angle-of-incidence data determined from the first difference parameter.

13. The imaging system of claim 11, wherein:
the first subset of pixels and the second subset of pixels of the first set of pixels are interleaved with each other in an alternating pattern; and
the first subset of pixels and the second subset of pixels of the second set of pixels are interleaved with each other in an alternating pattern.

14. An imaging method, comprising:
diffracting light received from a scene using a transmissive diffraction mask (TDM), the TDM comprising a first diffraction grating and a second diffraction grating, the first diffraction grating being configured to diffract a first portion of the received light to generate first diffracted light, the first diffracted light encoding information indicative of an angle of incidence of the received light, and the second diffraction grating being configured to diffract a second portion of the received light to generate second diffracted light, the second diffracted light encoding information indicative of the angle of incidence of the received light and a state of polarization of the received light;
detecting, with a first set of pixels, the first diffracted light and generating therefrom a corresponding first set of pixel responses;
detecting, with a second set of pixels, the second diffracted light and generating therefrom a corresponding second set of pixel responses;
determining, from the first set of pixel responses, angle-of-incidence data conveying the angle of incidence of the received light; and
determining, from the second set of pixel responses and the angle-of-incidence data, polarization data conveying the state of polarization of the received light.

15. The imaging method of claim 14, comprising:
providing the first diffraction grating with a first permittivity that determines at least in part a first sensitivity of the first diffraction grating to the state of polarization of the received light; and
providing the second diffraction grating with a second permittivity that determines at least in part a second sensitivity of the second diffraction grating to the state of polarization of the received light, wherein the second permittivity differs from the first permittivity.

16. The imaging method of claim 14, comprising:
providing the first diffraction grating to comprise a series of alternating ridges and grooves extending along a first grating axis at a first grating period; and
providing the second diffraction grating to comprise a series of alternating ridges and grooves extending along a second grating axis at a second grating period.

17. The imaging method of claim 14, wherein determining the polarization data conveying the state of polarization of the received light comprises:

determining the state of polarization of the received light as a linear polarization state; and determining a polarization angle of the linear polarization state with respect to a plane of incidence of the received light on the TDM.

18. The imaging method of claim 14, comprising generating a depth image of the scene based on the angle-of-incidence data.

19. The imaging method of claim 14, wherein:
generating the first set of pixel responses comprises:
generating a first subset of pixel responses corresponding to a first subset of pixels of the first set of pixels; and
generating a second subset of pixel responses corresponding to a second subset of pixels of the first set of pixels,
wherein the first subset of pixel responses and the second subset of pixel responses vary differently from each other as a function of the angle of incidence of the received light; and
generating the second set of pixel responses comprises:
generating a first subset of pixel responses corresponding to a first subset of pixels of the second set of pixels; and
generating a second subset of pixel responses corresponding to a second subset of pixels of the second set of pixels,
wherein the first subset of pixel responses and the second subset of pixel responses vary differently from each other as a function of the angle of incidence of the received light.

20. A non-transitory computer readable storage medium having stored thereon computer readable instructions that, when executed by a processor, cause the processor to perform a method of imaging a scene, the method comprising:
receiving a first set of pixel responses and a second set of pixel responses, the first set of pixel responses corresponding to a first portion of light received from the scene and having been diffracted, prior to detection, into first diffracted light encoding information indicative of an angle of incidence of the received light, and the second set of pixel responses corresponding to a second portion of the light received from the scene and having been diffracted, prior to detection, into second diffracted light encoding information indicative of the angle of incidence of the received light and a state of polarization of the received light;
determining, from the first set of pixel responses, angle-of-incidence data conveying the angle of incidence of the received light; and
determining, from the second set of pixel responses and the angle-of-incidence data, polarization data conveying the state of polarization of the received light.

* * * * *